United States Patent [19]

Santy et al.

[11] Patent Number: 5,367,221
[45] Date of Patent: Nov. 22, 1994

[54] MAGNETIC IMMUNITY SYSTEM (MIS) AND MONITOR INCORPORATING THE MIS

[75] Inventors: Patrick Santy, Roeselare; Gerrit Verstraete, Pittem, both of

[73] Assignee: Barco N. V.,

[21] Appl. No.: 68,702

[22] Filed: May 28, 1993

[51] Int. Cl.$^5$ .............................................. H01J 29/06
[52] U.S. Cl. ............................................ 315/8; 315/85
[58] Field of Search ......................................... 315/8, 85

[56] References Cited

U.S. PATENT DOCUMENTS 5,066,891  11/1991  Harrold et al. ............................ 315/8
5,073,744  12/1991  Buhler ...................................... 315/8

Primary Examiner—Robert J. Pascal
Assistant Examiner—Haissa Philogene
Attorney, Agent, or Firm—Beveridge, DeGrandi, Weilacher & Young

[57] ABSTRACT

An automatic axial field compensation and quick-degauss control system is disclosed. Further, a CRT type monitor incorporating such an automatic compensation and quick-degauss control circuit, and a new degauss circuit are disclosed in accordance with the present invention. The compensation and quick-degauss control circuit relies upon three sensors to respectively detect and quantify the axial, lateral, and vertical components of a disturbing ambient magnetic field. The axial and lateral field component sensors have non-parallel axes of sensitivity such that the sum of values represented by the output signals from these sensors indicates the magnitude of the axial component of the disturbing field. Based upon this summation signal, the system applies a correction current to at least one correction coil. If more than one correction coil is employed, the coils are connected in series so that only one current need be generated to effect compensation. Outputs from all three of the sensors are involved in quick-degauss control. The third sensor is a vertical component sensor. The disclosed quick degauss system is different from the resonant types, it operates by a switched mode. Voltage over the degaussing coils is switched between a positive and negative voltage, which voltages are stored in large capacitors.

31 Claims, 13 Drawing Sheets

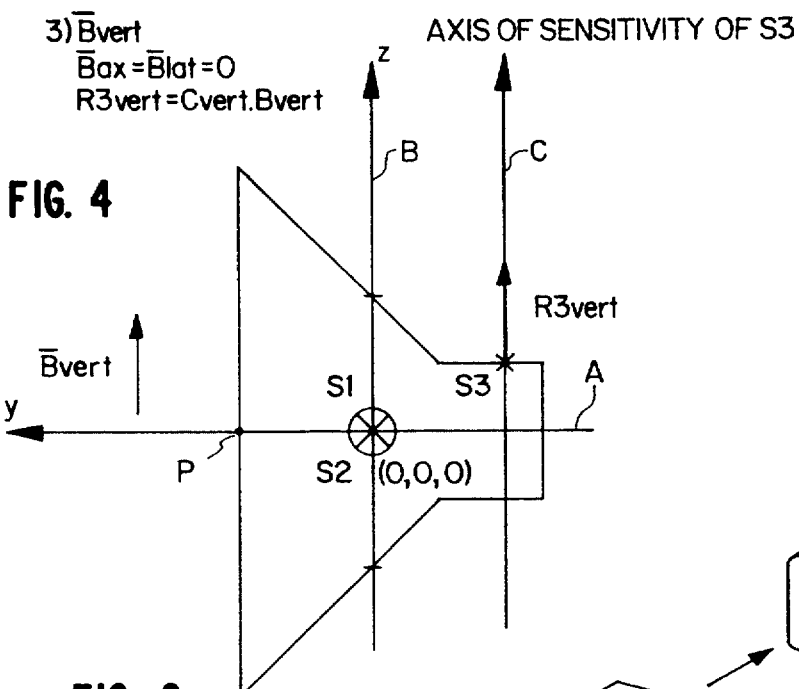
FIG. 4
3) $\overline{B}vert$
$\overline{B}ax = \overline{B}lat = 0$
$R3vert = Cvert \cdot Bvert$
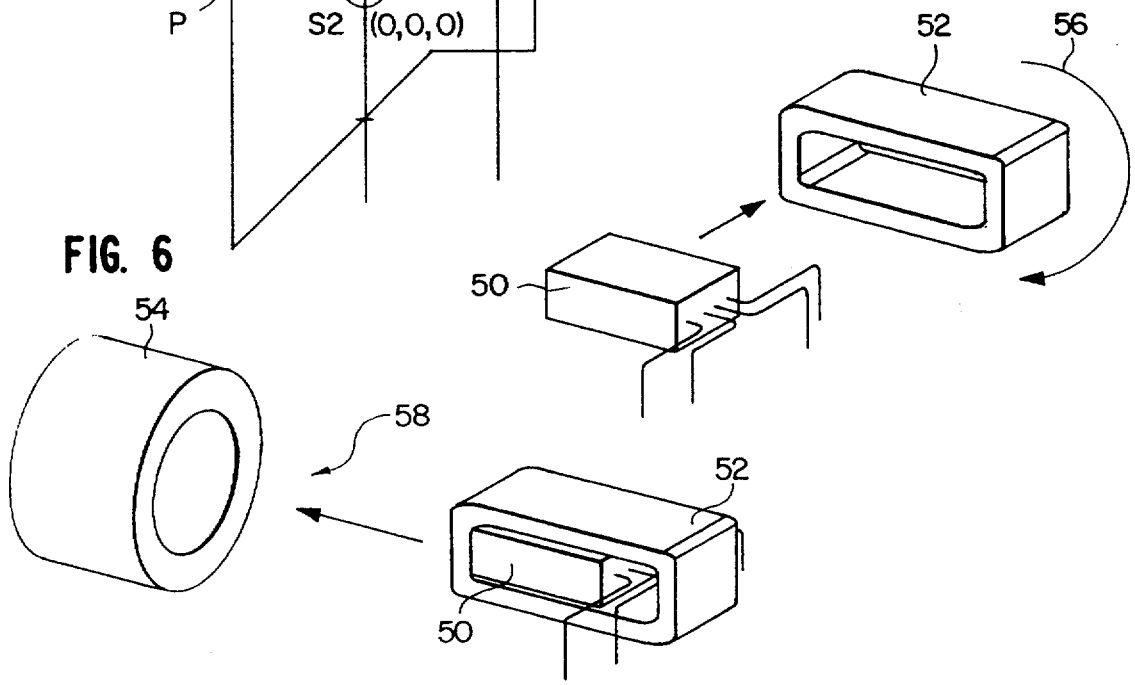
FIG. 5
FIG. 6
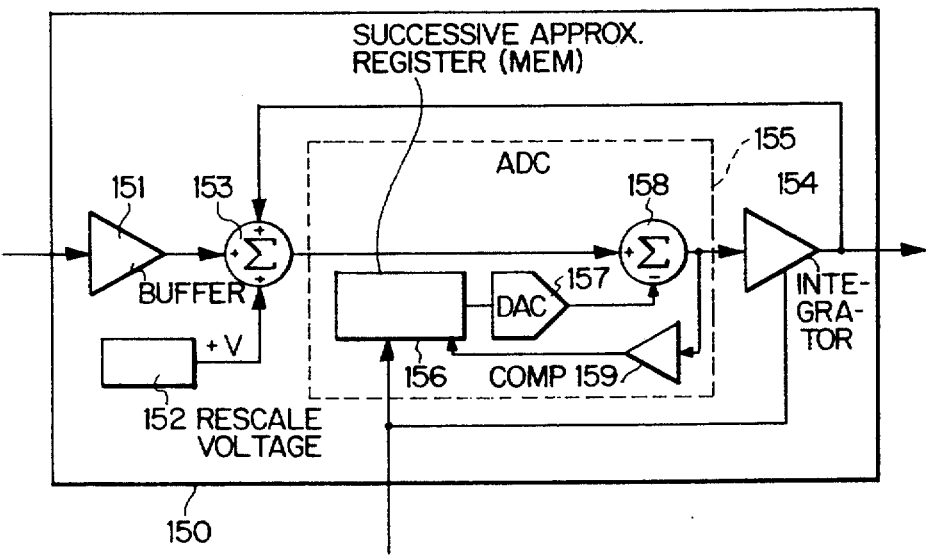
FIG. 9

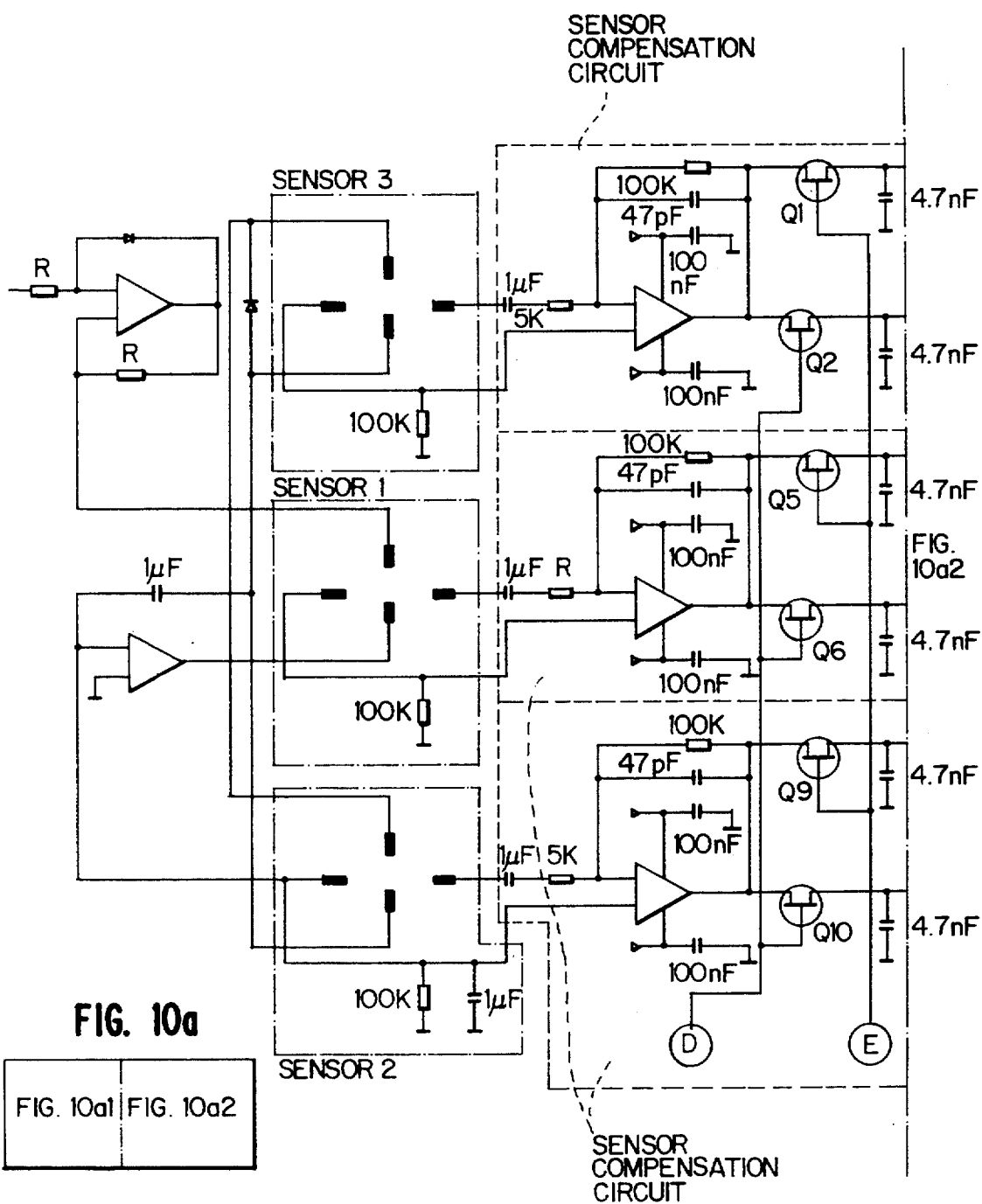
FIG. 10a1

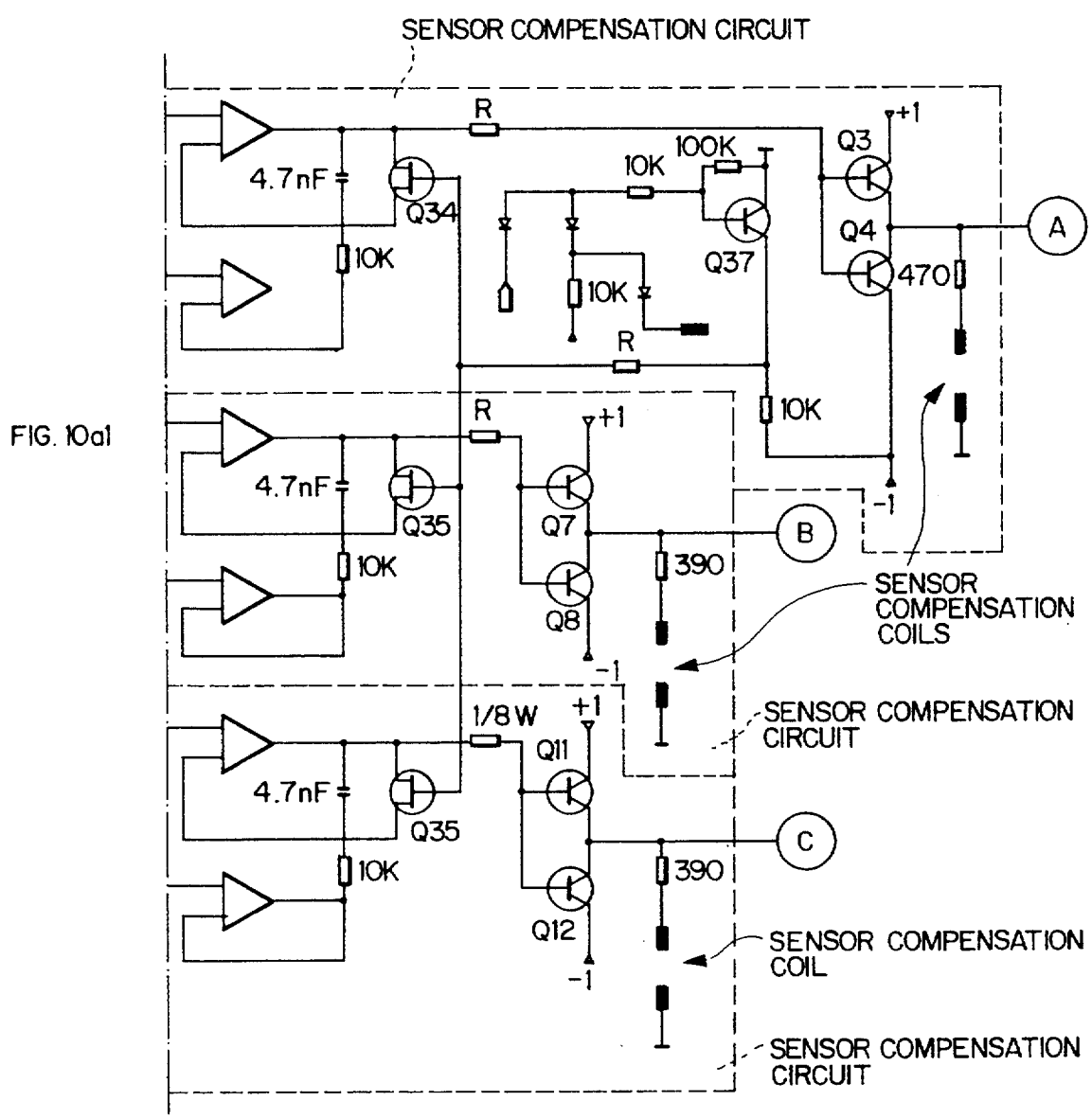
FIG. 10a2

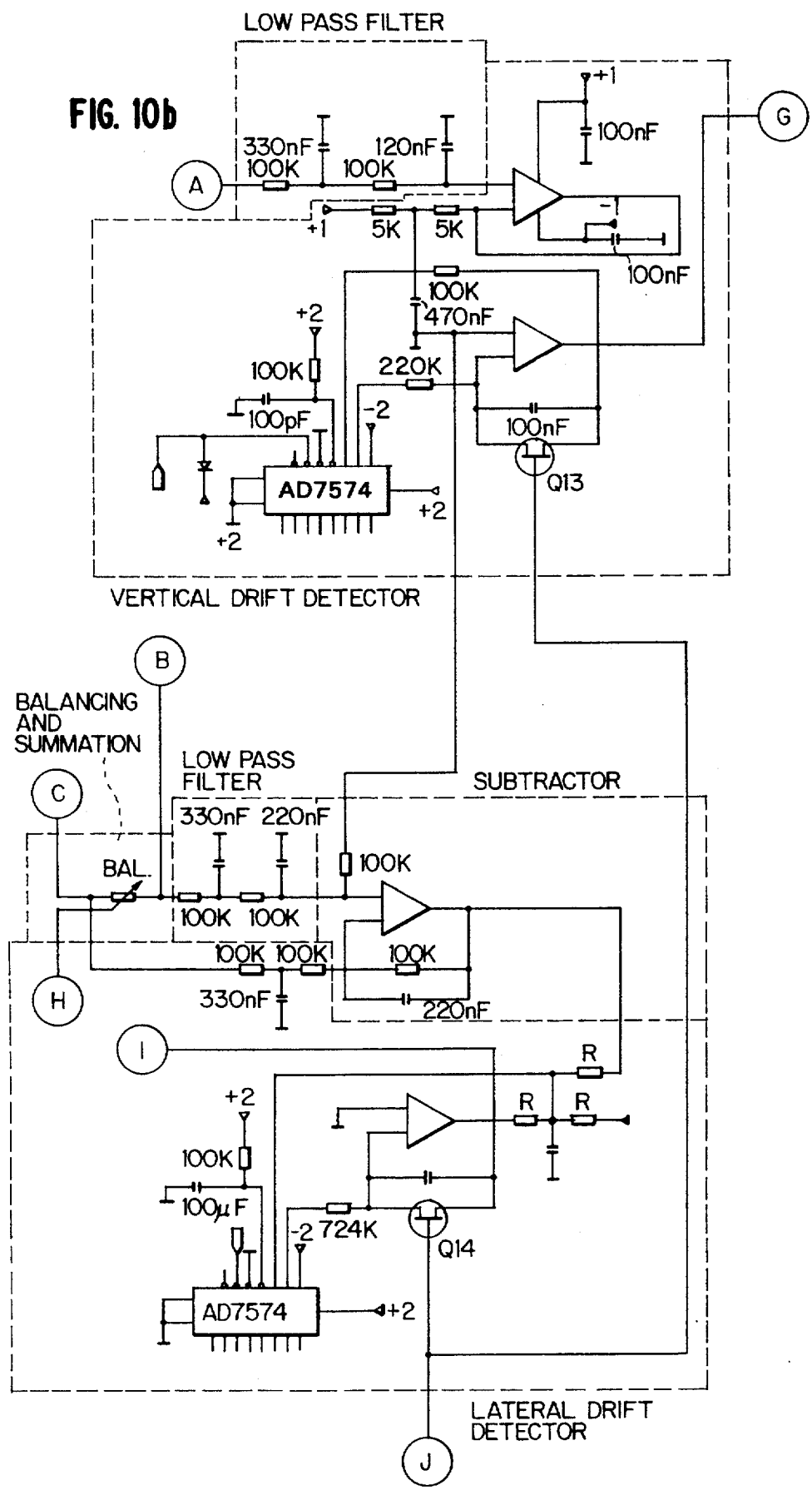

TIMER AND START-UP CIRCUIT

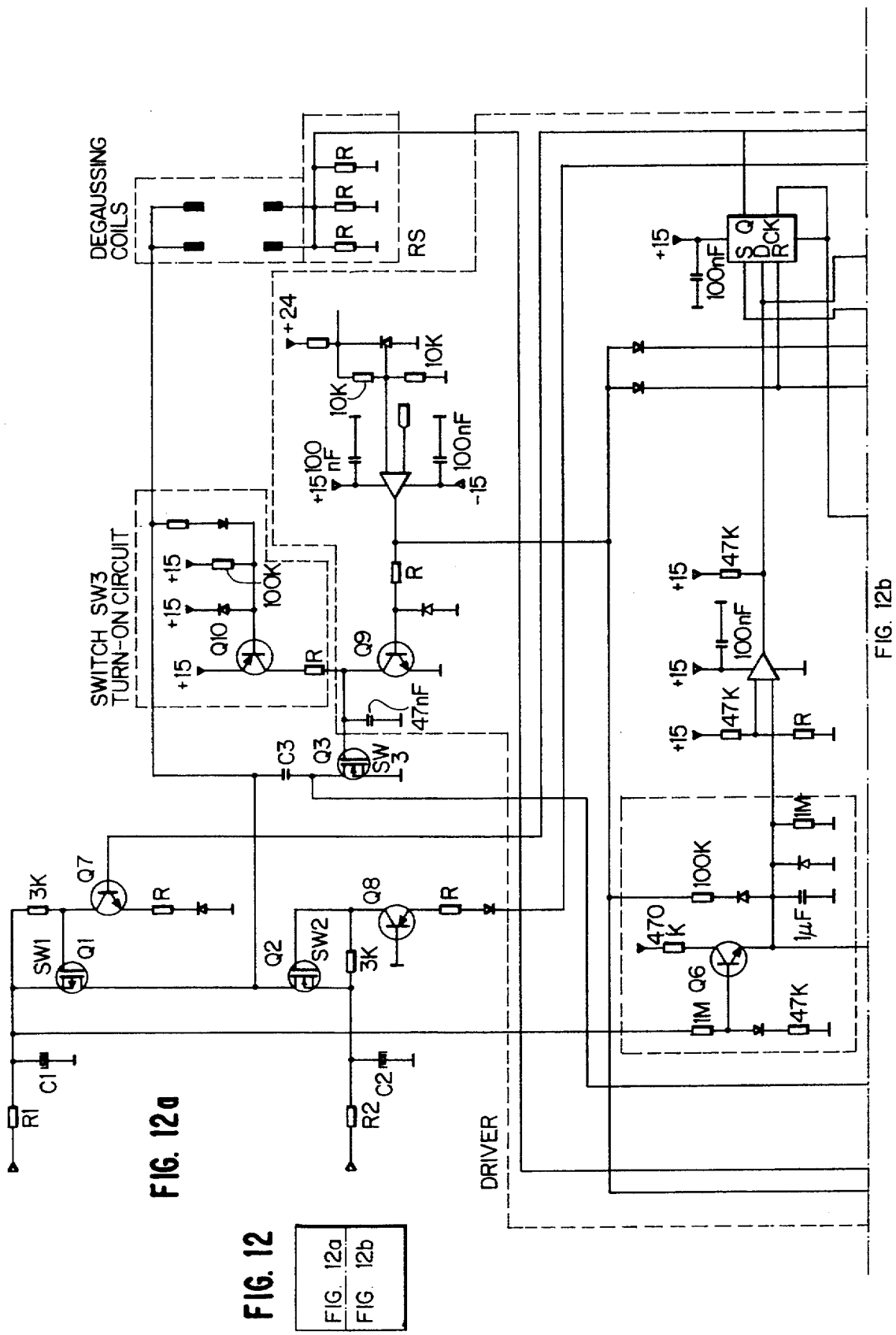

MAGNETIC IMMUNITY SYSTEM (MIS) AND MONITOR INCORPORATING THE MIS

BACKGROUND OF THE INVENTION

The present invention relates to a relatively inexpensive and simplified magnetic immunity system which fully compensates for the effects of primarily the axial component of an ambient magnetic field to which the system is exposed, and which effects automatic quick-degaussing as necessary. The invention also relates to a monitor, in particular a color monitor, which includes such a magnetic immunity system, and to a method of compensating for the effects of an ambient magnetic field on the cathode ray tube (CRT) of such a color monitor.

Rather extensive efforts have now been made with the goal of neutralizing the effects that a substantial ambient magnetic field has on a cathode ray tube (CRT) color monitor. There are three primary effects of such a magnetic field on a CRT color monitor. These effects are now well recognized. First, the field may cause the electron beam to focus on an incorrect phosphor area. In a color monitor, the electron beam which is, for example, determined to target a red phosphor, could be driven by a strong ambient field to impinge on a blue or green phosphor area. This results in a change in the image color, and thus a color purity error. This may be the worst result caused by exposure to such ambient fields. A second problem is when the field causes the entire image to shift on the screen (image translation). When image translation is caused by a static field, compensation is rather simple. When the shift is caused by alternating magnetic fields, without compensation, the screen image will appear to wobble. The third general category of errors caused by ambient fields, particular very strong fields, is convergence error. This is where a white line appears as split into three colored lines, i.e. red, green and blue.

There have been several approaches to compensation for the effects of an ambient magnetic field on CRT monitors. Modern approaches involve a passive magnetic shielding for protection of areas of the CRT other than necessary for viewing. In addition to the shielding, compensation coils have been positioned about the monitor in order to produce offsetting magnetic fields. Teaching a manner of controlling such compensation coils, U.S. Pat. No. 4,380,716 has been understood as disclosing the generation of patterns at the corners of the monitor screen by the electron beam gun assembly. Then, changes in the pattern due to the changes in the ambient field are sensed by optical sensors to control current flow through compensation coils to provide for axial correction. A different approach is set out in U.S. Pat. No. 3,757,154 and involves magnetic sensors in a bridge configuration to control current flow through compensation coils.

Other systems have been disclosed in U.S. Pat. Nos. 4,963,789; 5,039,911; and 5,073,744. As understood from these patents, four magnetic sensors are provided in a plane to have parallel primary axes of sensitivity. Each of the sensors is associated with one of four corresponding compensation coils, and each coil is driven by a current applied thereto in accordance with an ambient magnetic field as sensed by its respective sensor. The coils have a common center. With this disclosed arrangement of four sensors and four corresponding coils, compensation is performed for intrusive vertical and lateral magnetic field components as well as the axial component. However, such a system is complicated. It is relatively expensive and requires a complicated calibration routine which would tend to lengthen repair time when necessary for such a machine.

Also in the context of prior efforts, U.S. Pat. No. 4,458,178 is recognized as disclosing a degaussing arrangement for a CRT. U.S. Pat. Nos. 3,340,443 and 3,340,307 are recognized as relating to a degaussing system, and a demagnetization system for a color television respectively.

SUMMARY OF THE INVENTION

In view of prior approaches to magnetic field compensation, the present invention presents a relatively inexpensive and uncomplicated manner of effectively compensating for the most salient and most intrusive effects of an ambient, disturbing field. The present invention relates to a magnetic immunity system (MIS system) as well as a cathode ray tube CRT system incorporating such an MIS system, and further a method of providing magnetic immunity in a CRT monitor. The invention also relates to a new degaussing system. The MIS system in accordance with the preferred embodiments of the invention is directed to detecting and compensating for the axial component of a disturbing magnetic field. The axial component is considered as primarily influencing a CRT type monitor through at least one point in a plane which is tangent to, or otherwise extends through the image face or screen of the CRT. It is contemplated that the monitor is otherwise protected by a passive magnetic shield which surrounds all parts of the CRT, except for its image surface. Indeed, the composite MIS arrangement disclosed herein includes a passive magnetic shield around all other portions of the CRT.

In the preferred embodiments, the MIS system, in addition to the magnetic shield, includes a circuit for effecting axial field component compensation, and automatic degaussing whenever the system determines that degaussing is necessary. To carry out the MIS system, three sensors are particularly located about the monitor, and at least one correction coil is provided. Preferably, a first correction coil is provided in front of the image face, beyond the shield, in order to carry out purity adjustment. A second correction coil is located near the convergence ring of the CRT to correct for variations in convergence. Optionally, a third correction coil can be provided near the deflection yoke of the monitor in order to compensate for scan rotation. It is a feature of the present invention that each of the compensation coils utilized therein are connected in series so that a single current is generated by the MIS and applied to the two or three series-connected correction coils.

The arrangement of the sensors in accordance with the present invention provides for full measurement of the axial field component with two sensors, and full detection of the ambient field, for degaussing purposes, with three sensors. The sensors are arranged such that none of their primary axes of sensitivity are in parallel. Indeed, the sensitivity axes of two of the sensors define a horizontal plane in the preferred embodiments, however, within this plane, these two axes are at an angle with respect to each other. Further, in the preferred embodiments, the axis of sensitivity of the third or vertical sensor is orthogonal to this plane defined by the first two sensors which respectively provide sensitivity for the axial and lateral components of an intrusive magnetic field.

All three sensors are located outside of the protective shield for the monitor. The first component sensor is provided in the −x direction along a horizontal axis which passes through a central point (O,O,O) of the monitor. A second component sensor is provided in the +x direction along this horizontal axis, in opposition to the first field sensor. The axis of sensitivity of the first sensor extends from its location at the point (−x,O,O) through a region about the point P located in the plane tangent to or otherwise extending through the image face of the CRT. On the other hand, the axis sensitivity of the second sensor extends from the location of this sensor at about the point (x,O,O) through the region at about the same point P on the front plane of the monitor. In the preferred embodiments, this point P on the front plane is at an equal distance (in the ±x directions) between the locations of the two sensors and the axes of sensitivity of sensors S1 and S2 that intersect there. When the axial and lateral component sensors are arranged in this way, the sum of the outputs from these sensors provides a summation value which represents the axial component of the disturbing field. Further, the difference of the axial and lateral field component sensor outputs represents the magnitude of the lateral component of the disturbing field.

The third or vertical component sensor is set back in the −y direction from the horizontal axis extending through the axial and lateral field component sensors, and set above this horizontal axis in the +z direction. The axis of sensitivity of this third or vertical sensor is only in the +z direction so that it measures the vertical component of the ambient field. Magnetic compensation, namely axial field compensation, is based upon the summation signal from the axial and lateral component sensors. The outputs from all three of the sensors are utilized in determining whether an automatic degaussing sequence is to be performed. The output from the summation circuit is applied to an axial compensation and gain adjustment circuit which, as the name implies, features adjustable gain for 100% axial field compensation. The axial compensation and the gain adjustment circuit applies the compensation current directly to the series-connected compensation coils.

The output from the compensation circuits of the axial field and lateral field sensors also are supplied to a subtractor circuit to provide measurement of the lateral field component. The output from the subtractor circuit, the output from a sensor coil compensation circuit for the vertical component sensor, and also the output from the summation circuit are each applied to a separate low pass filter element from which they are applied to drift detector circuits. The drift detector circuits carry out analog-to-digital and digital-to-analog conversion functions. Each such circuit further has a memory element which stores the ambient magnetic field strength measured at the end of a previous degaussing cycle. Comparative circuits cooperate to generate a signal which will cause initiation of a new degaussing cycle whenever the strength of the ambient field as measured after the previous degaussing cycle differs from the current measured field strength by a predetermined amount. In the preferred embodiments, it is contemplated that a new degaussing cycle will be initiated when the MIS system determines that any of the axial, lateral or vertical field components of the present ambient field differs from the previous value thereof (measured at the end of the previous degaussing cycle) by the predetermined value. To this end, the outputs from each of the comparator circuits provide inputs to an OR gate which thus provides a high output upon receiving a high output from any of the comparator circuits.

Further, in accordance with the preferred arrangement of the present invention, the OR gate provides a high output to a timer and start-up circuit. It is the timer and start-up circuit which provides the actual degaussing control pulse to a degaussing circuit. The timer and start-up circuit is contemplated as setting the degaussing pulse duration. It also generates a write command signal for causing the memory elements of each drift detector circuit to store the current ambient field strength value at the end of each new degaussing cycle.

A suitable degaussing circuit for use with the present invention includes a driver circuit to which the degauss control pulse from the timer and start-up circuit is applied. The driver circuit controls transistor switches to selectively cause the discharge of large capacitors to provide currents for the monitor degaussing coils. In a preferred embodiment, the degaussing cycle has a duration of about 40 ms. The driver circuit receives input from a current sensor, attached to the degaussing coil, for controlling the switches in response thereto. It controls the switches such that a time decreasing amplitude AC current is applied to the degaussing coil. At the end of a degaussing cycle, the driver circuit inhibits application of voltage to the degaussing coil such that the coil current exhibits damped resonance at a high frequency.

BRIEF DESCRIPTION OF THE DRAWINGS

Further aspects and features of the present invention will be more apparent from the following detailed description and drawings, and the appended claims. In the drawings:

FIG. 4 is a vector diagram which illustrates the axis of sensitivity, and the output for the vertical component sensor;

FIG. 5 is a perspective exploded view illustrating a suitable magnetic sensor circuit arranged with a polarization coil;

FIG. 6 is a perspective view, similar to FIG. 5, of the sensor circuit and polarization coil in connection with a cylindrical compensation winding into which the sensor circuit and polarization coil are installed;

FIG. 9 is a block diagram of a preferred drift detector circuit for use in the circuit of FIG. 8;

FIGS. 10a through 10e together provide a circuit diagram which illustrates a preferred implementation of the axial compensation and degauss control circuit of FIG. 8;

DETAILED DESCRIPTION OF THE PREFERRED EMBODIMENTS

Figure 1:
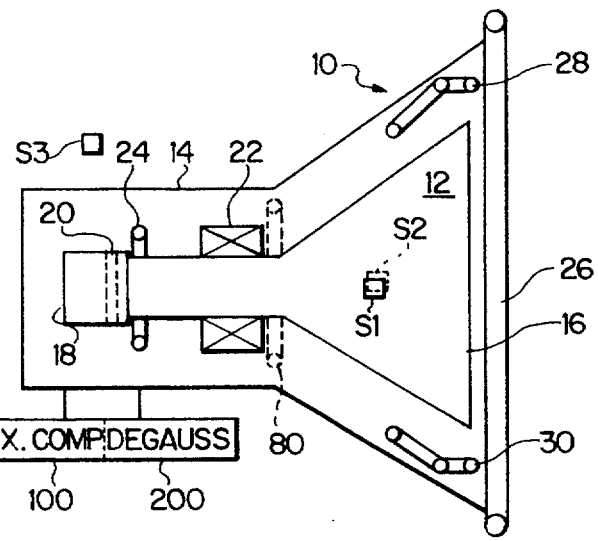
FIG. 1 is schematic view illustrating a monitor equipped with an axial compensation and degaussing control circuit in accordance with the present invention.

A cathode ray tube monitor 10 in accordance with the present invention is schematically shown in FIG. 1. Monitor 10 includes a conventional cathode ray tube (CRT) 12 and a magnetic immunity system (MIS) which compensates for the effects of an ambient magnetic field on the CRT. The preferred magnetic immunity system (MIS) in accordance with the present invention includes three primary subsystems. The subsystems of the preferred MIS include a magnetic shield 14 which surrounds the CRT 12, an automatic compensation system for axially-intrusive magnetic fields, and an automatic quick-degauss system. The shield 14 and the automatic compensation system cooperate to substantially instantaneously eliminate the influence of an ambient magnetic field on the monitor 10. The preferred quick-degauss subsystem in accordance with the present invention independently determines whether or not demagnetization of the monitor 10 is necessary, and then rapidly performs a degaussing operation if such is determined to be necessary.

Magnetic shield 14 is conventional and provides for passive neutralization of external magnetic fields. On the other hand, the automatic compensation system of the present invention provides an active response for neutralizing those portions of the ambient field which penetrate the monitor 10 at areas where the shield 14 is not present. Shield 14 essentially is considered to neutralize all components of an ambient field which are substantially parallel to the front side or image surface 16 (screen) of the CRT 12. Accordingly, preferred shield 14 is formed of a material which is absorptive of a magnetic field. This material should have a high magnetic permeability and should exhibit low hysteresis. Materials such as MUMETAL (trademark of Spang and Co.) for example or other known materials with a 36% nickel content are suitable. In the preferred embodiments, shield 14 extends over the CRT image face 16 by about two centimeters. It should completely cover the back portion of the CRT 12 and protect the electron gun assembly 18 as indicated in FIG. 1. Shield 14 thus surrounds the electron gun assembly 18 as well as the convergence rings 20 for the CRT, and the deflection yoke 22 thereof. Shield 14 also surrounds one of two successive coils 24, 26 which are part of the automatic compensation system, as well as degaussing coils 28, 30 which are located above and beneath the CRT as shown. Coil 26 is located outside of shield 14. Preferably, coils 24 and 26 are provided in (different) planes parallel to that of the image face 16 with their centers in the same line as a line which is perpendicular to the plane of the image face and which extends through the center of the image face.

Due to the material forming such a shield 14, the preferred shield is contemplated as possessing a small magnetic reluctance. Hence, the shield 14 itself will act to guide magnetic field lines. This property of the shield 14 is advantageous in increasing the degaussing field strength in order to amplify degaussing.

With reference to FIGS. 1 through 4, three sensors S1, S2, S3, are provided for detecting portions of an ambient magnetic field which influences the monitor 10. Hereinafter, the portions of an ambient field which affect the monitor 10 will be referred to as the "disturbing magnetic field" $\bar{B}$. In the preferred embodiment, sensors S1, S2, S3 are part of both the automatic compensation system 100, and the quick-degauss system 200. They detect components of the intrusive disturbing field and generate output signals which represent the magnitude of such field components for use by the remaining elements in each of the automatic compensation and quick-degauss systems 100 and 200.

Figure 2:
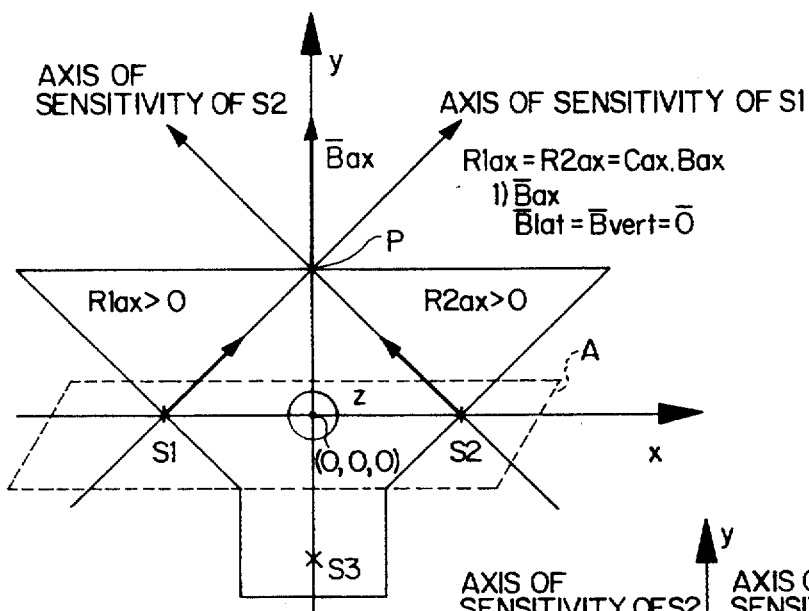
FIG. 2 is a vector diagram illustrating the axes of sensitivity of the axial and lateral component sensors, and the outputs thereof.
Figure 3:
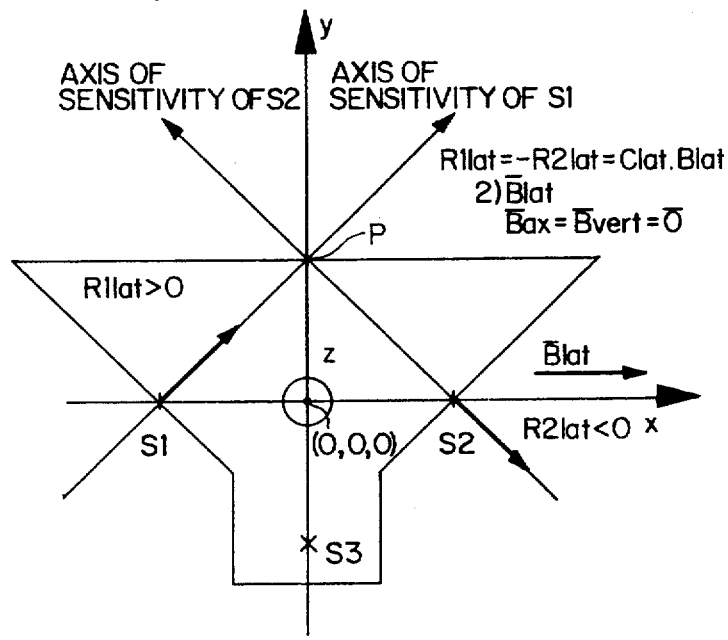
FIG. 3 is a vector diagram, similar to FIG. 2, which particularly relates to the output of the lateral component sensor.

Sensors S1, S2, S3 are located for measurement at particular regions within the monitor 10, outside of the magnetic shield 14, in order to accurately provide output signals which represent each of three components of the disturbing magnetic field. Sensors S1, S2, and S3 measure the disturbing field at their respective locations, however, as will be even better understood from the following, due to their respective axes of sensitivity, they provide reliable measures of the individual components of the disturbing field. FIGS. 2 through 4 are vector diagrams useful for illustrating the relationships of the outputs from sensors S1, S2, and S3 when they are particularly positioned and have their respective primary axes of sensitivity aligned as shown. With reference to FIGS. 2 through 4, an origin point (O, O, O) is identified at a central point in a x-z plane A through the monitor 10. The origin point can be defined arbitrarily in the −y direction from the image face 16.

With respect to the downwardly-looking diagrams of FIGS. 2 and 3, sensor S1 is located at about the point (−x, O, O) with respect to the origin, while sensor S2 is located at about the point (x, O, O) with these two points being in a plane A which is parallel to the plane of the paper and which is perpendicular to the plane of image face 16 so that it extends through and substantially bisects the image face. As seen from the side-view vector diagram of FIG. 4, sensor S3 is located at about a point (O, −y,z) which is in a plane C that is parallel to, and to the rear of a plane B that extends through the origin and sensors S1 and S2 and is perpendicular to plane A. Sensor S3 thus is elevated with respect to sensors S1 and S2.

Sensors S1, S2, S3 are particularly placed at regions in order to provide simplified calculation of the components of the disturbing magnetic field, $\bar{B}$, in the x-direction, the y-direction, and the z-direction. The primary axis of sensitivity of sensor S1 extends from the sensor's position at (−x,O,O) through a point (O,y,O), which point preferably corresponds with the center of a plane through the monitor image face 16. The primary axis of sensitivity of sensor S2 preferably is substantially orthogonal to that of sensor S1 and is defined by the ray from point (x,O,O) through the point (O,y,O). With respect to FIG. 4, the primary axis of sensitivity of sensor S3 is in the positive z-direction. Thus, in the preferred embodiments, none of sensors S1, S2, S3 have their axes of sensitivity in parallel. All of sensors S1, S2, S3 are located to the rear (in the −y-direction) of the monitor image face 16, and outside of the shield 14.

In FIGS. 2 through 4 and the equations below, "R" designates the electronic signal response of the sensors so that $R_1$ is the electronic response of sensor S1, $R_2$ is the response of sensor S2, and $R_3$ is the response of sensor S3. The disturbing field, $\overline{B}$, is given by the sum of its components $$\overline{B} = \overline{B}_{ax} + \overline{B}_{lat} + \overline{B}_{vert} \qquad (1)$$

Due to its position and the alignment of its axis of sensitivity, sensor S1 generates an output of $R_1$ which is shown below $$R_1 = R_{1ax} + R_{1lat}. \qquad (2)$$

Sensor S2 provides a similar response $R_2$ as given below $$R_2 = R_{2ax} + R_{2lat} \qquad (3)$$

where $$R_{2ax} = R_{1ax}. \qquad (4)$$

However, as concerns the lateral component, $\overline{B}_{lat}$, the output of sensor S2 is negative with respect to the output of sensor S1. Thus, $$R_{1lat} = -R_{2lat} \qquad (5)$$

For each of sensors S1 and S2, $R_{1vert} = R_{2vert} = 0$ because the direction of sensitivity for these sensors is substantially perpendicular to the z-axis. Accordingly, the response of sensor S3 is given by the simple equation $$R_3 = R_{3vert} \qquad (6)$$

because $R_{3ax} = R_{3lat} = 0$ as the direction in which sensor S3 is sensitive is perpendicular to both the x and y axes.

Now, because of the sensitivity axes of sensors S1 and S2, the sum of their outputs represents the axial component strength $\overline{B}_{ax}$ as shown $$R_1 + R_2 = R_{1ax} + R_{1lat} + R_{2ax} + R_{2lat} \qquad (7)$$

but since from equation (4), $$R_{1ax} = R_{2ax} = C_{ax} B_{ax}$$

and from equation (5), $$R_{1lat} = -R_{2lat}$$

we obtain $$R_1 + R_2 = R_{1ax} + R_{1ax} + R_{1lat} - R_{1lat} = 2R_{1ax} = 2C_{ax}\overline{B}_{ax}. \qquad (8)$$

The value $C_{ax}$ is a constant.

For the lateral component, $\overline{B}_{lat}$, the difference of the outputs of sensors S1 and S2 represents the magnitude thereof. Accordingly, we have $$R_1 - R_2 = R_{1ax} - R_{2ax} + R_{1lat} - R_{2lat} \qquad (9)$$

and from equations (4) and (5), we obtain $$\begin{aligned} R_1 - R_2 &= R_{1ax} - R_{1ax} + R_{1lat} - (-R_{1lat}) \\ &= 2R_{1lat} \\ &= 2R_{2lat} \\ &= 2C_{lat}\overline{B}_{lat}. \end{aligned} \qquad (10)$$

A constant $C_{lat}$ likewise is introduced in equation 10. Next from equation (5) we get $$R_3 = R_{3vert} = C_{vert}\overline{B}_{vert} \qquad (11)$$

where again $C_{vert}$ is a constant. Then, from equations (8), (11), and (12), the axial, lateral, and vertical components of the disturbing field $\overline{B}$, are given as follows:

$$\overline{B}_{ax} = 1/2 C_{ax}(R_1 + R_2) \qquad (12)$$

$$\overline{B}_{lat} = 1/2 C_{lat}(R_1 - R_2) \qquad (13)$$

$$\overline{B}_{vert} = R_3/C_{vert}. \qquad (14)$$

FIGS. 5 and 6 illustrate a preferred sensor arrangement which incorporates a Philips KMZ10B or equivalent magneto-resistive bridge sensor circuit 50. Such a sensor circuit 50 is provided with both a polarization coil 52 and a compensation coil 54. In the preferred, embodiment, it is contemplated that for sensors provided with both polarization and compensation coils 52, 54, both coils are to be used simultaneously. The compensation coil 54 provides for linear measurement, even in the presence of strong ambient magnetic fields. The signal which drives the compensation coil 54 is proportional to the magnetic field strength. This substantially immunizes such a sensor from linearity errors whereby it is independent of temperature variations. The polarizing coil 52 assures a low temperature insensitivity offset.

In the sensor arrangement shown in FIGS. 5 and 6, the sensor circuit 50 is enclosed within a rectangularly arranged polarization winding 52. The winding direction of polarization winding 52 is shown by arrow 56 in FIG. 5. In a preferred embodiment, polarization coil 52 comprises 85 windings of 0.18 thermoplast wire to have an inductance of about 78 μH, within a range of about of ±10%. Next, as seen from FIG. 6, the encased sensor circuit 50 and rectangular winding 52 are inserted axially within a second cylindrical compensation winding 54. Then, the combined assembly 58 of the sensor circuit 50 and the rectangular and cylindrical windings 52, 54 is mounted to a mounting block such as a PC board (not shown) for installation to monitor 10.

Figure 7:
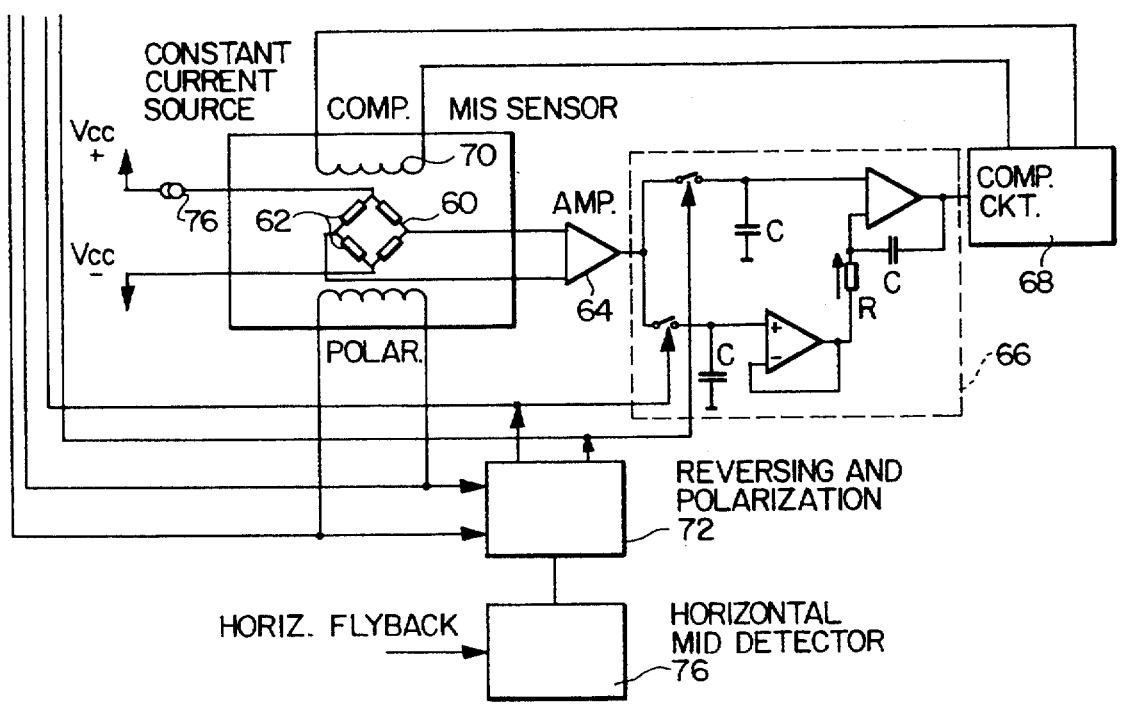
FIG. 7 shows a preferred sensor suitable for use in accordance with the present invention in partial block diagram form.
Figure 10C:
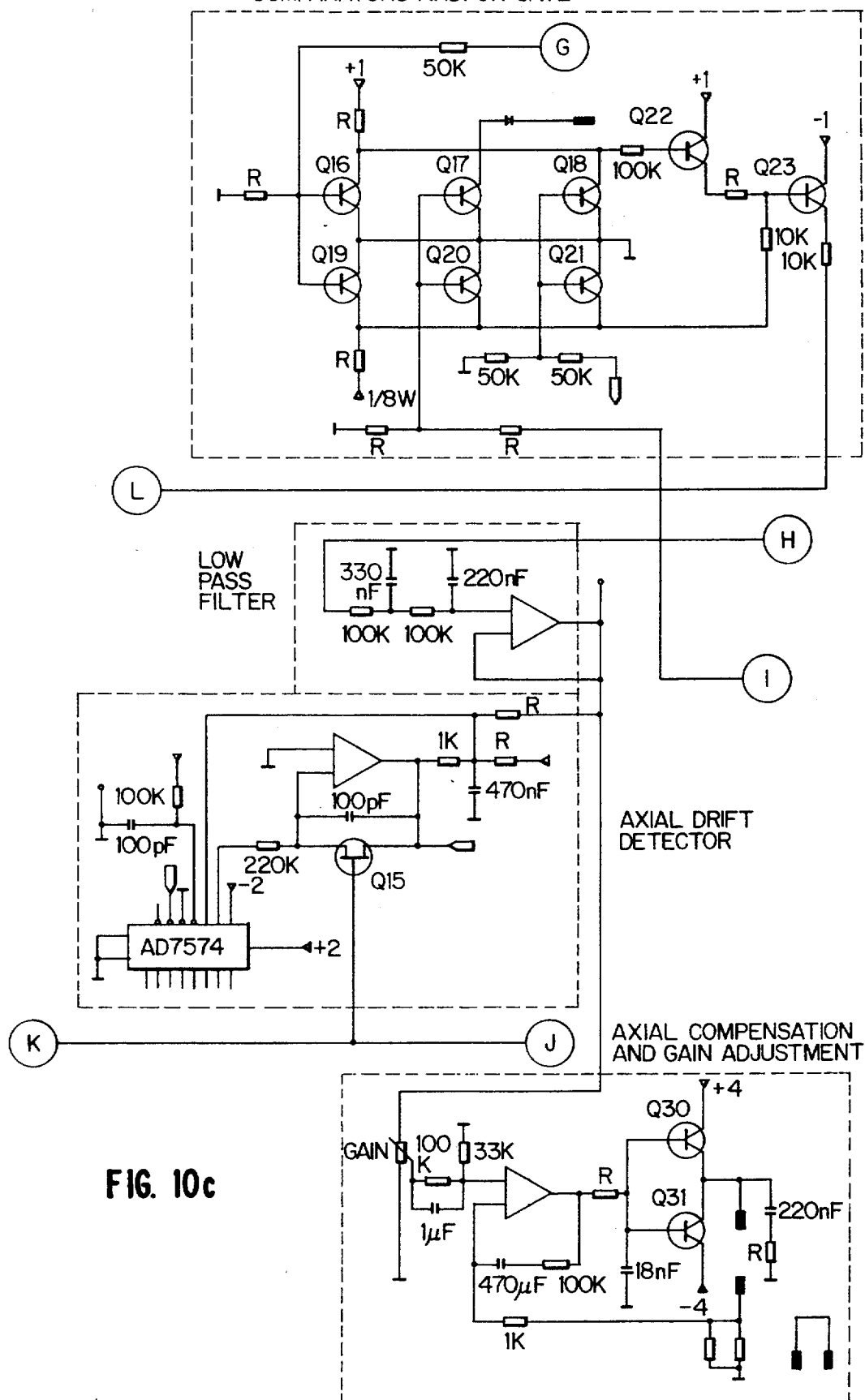
Figure 10D:
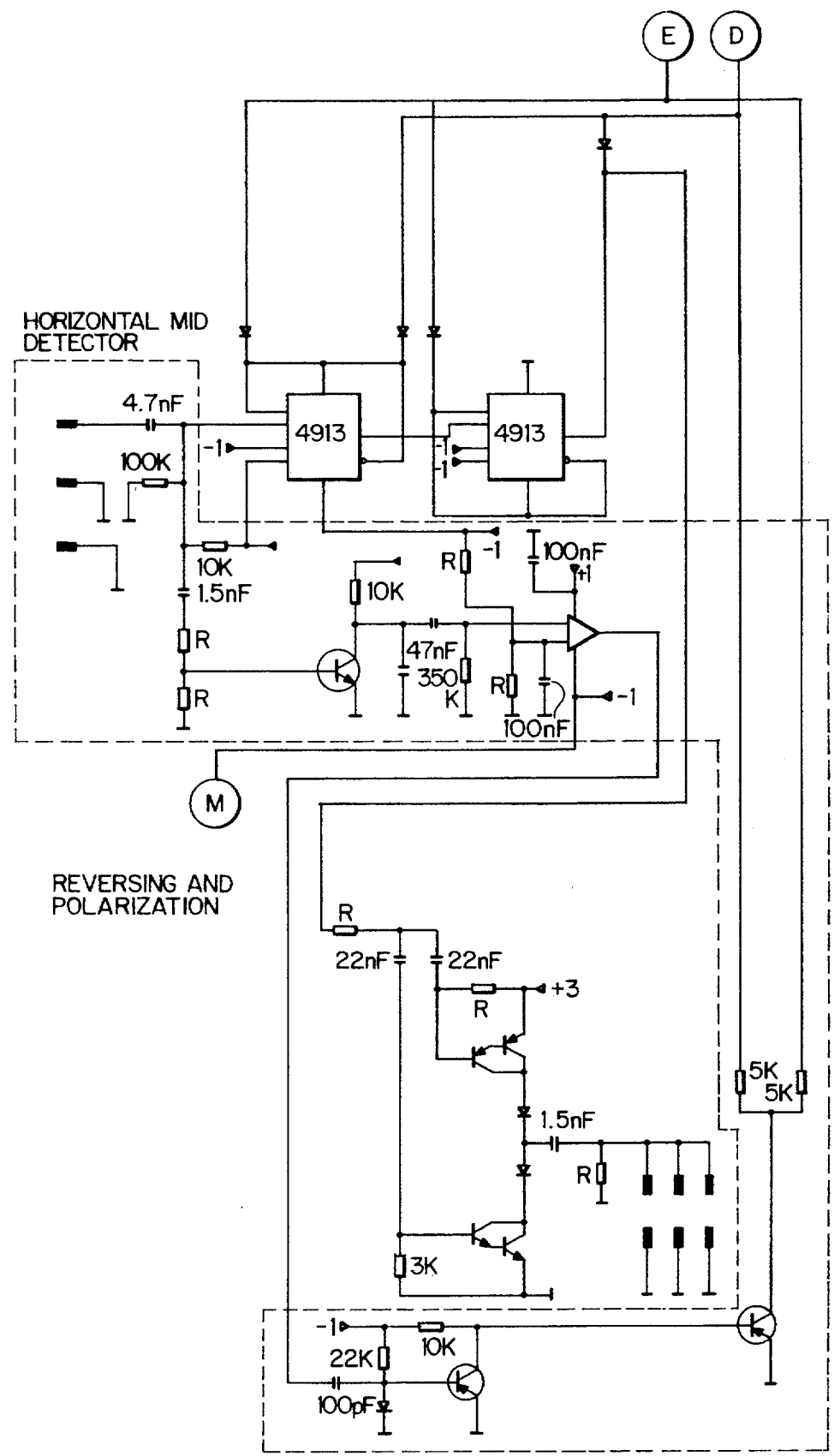
Figure 10E:
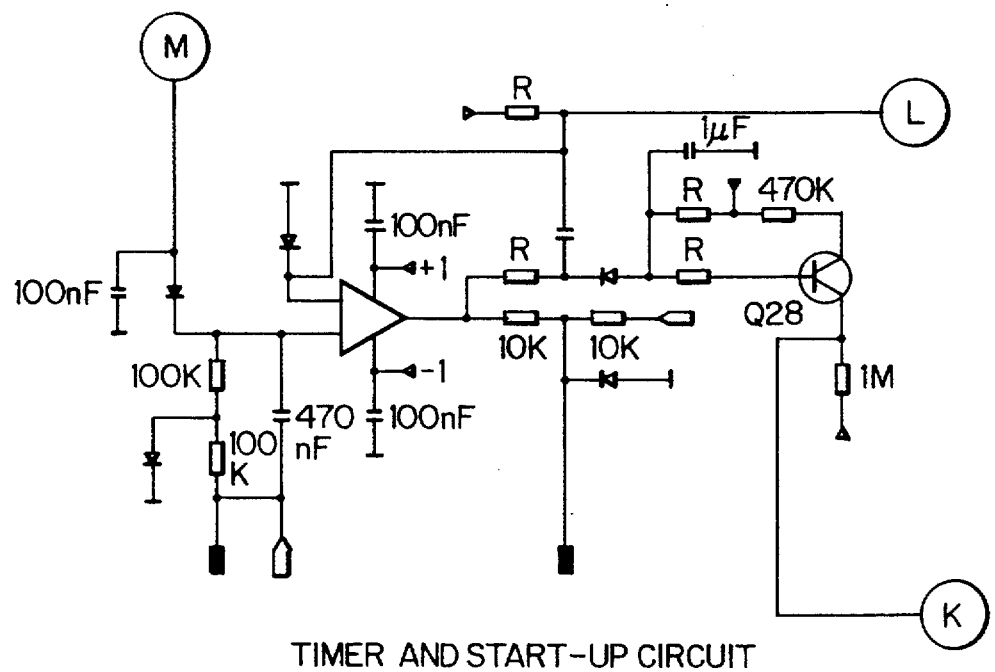

The structure of each of sensors S1, S2 and S3 preferably is the same. With reference to FIGS. 7 and 10a, according to the preferred embodiments, when sensors such as the Philips KMZ10B are used, each of sensors S1, S2, S3 comprises a Wheatstone bridge 60 with four identical resistive elements 62. Wheatstone bridge 60 is supplied by a constant current source 76. This arrangement provides for reduced temperature dependence. Each Wheatstone bridge 60 provides an output to an amplifier 64 which also receives input power. An output from each amplifier 64 is applied to an opamp circuit 66 which integrates the output from the Wheatstone bridge 60 and applies an integrated output signal to a current control circuit i.e. "compensation circuit" 68 which applies current to each sensor's compensation coil 70. The current applied to the compensation coil 70 is regulated for zero measurement and indicates the magnitude of the magnetic field component detected by the sensor. The magnetic field actually sensed by the sensor is zero, because the output thereof is integrated and fed back to the sensor by the sensor compensation coil. We have $$I = (V_2 - V_1)/R$$

$$U = V_1 + \int I/C \, dt$$

$$= V_1 + \int \frac{(V_2 - V_1)}{RC} \, dt.$$

In normal operation, V is constant, therefore $V_1$ must equal $V_2$. On the other hand, $V_2$ is the inverse of $V_1$ so both $V_1$ and $V_2$ must equal zero. Thus there is zero measurement (the magnetic field sensed by the sensor equals zero). Further, located outside of shield 14, the sensors S1, S2, S3 are only slightly affected by compensation fields generated by circuit 100. As such there is substantially no magnetic feedback experienced from coils 24, 26 and 30. FIG. 7 also shows the reversing and polarization control 72 for simultaneously controlling all of sensors S1, S2, S3. This control 72 is operated in a manner which likewise will be apparent to those of ordinary skill in the art from this disclosure. Further, the horizontal/mid detector 74 is a well known circuit for sensor control which will assure that the measurement will take place when deflection current is approximately zero and that all deflection fields will have no influence on the measurements.

Figure 8:
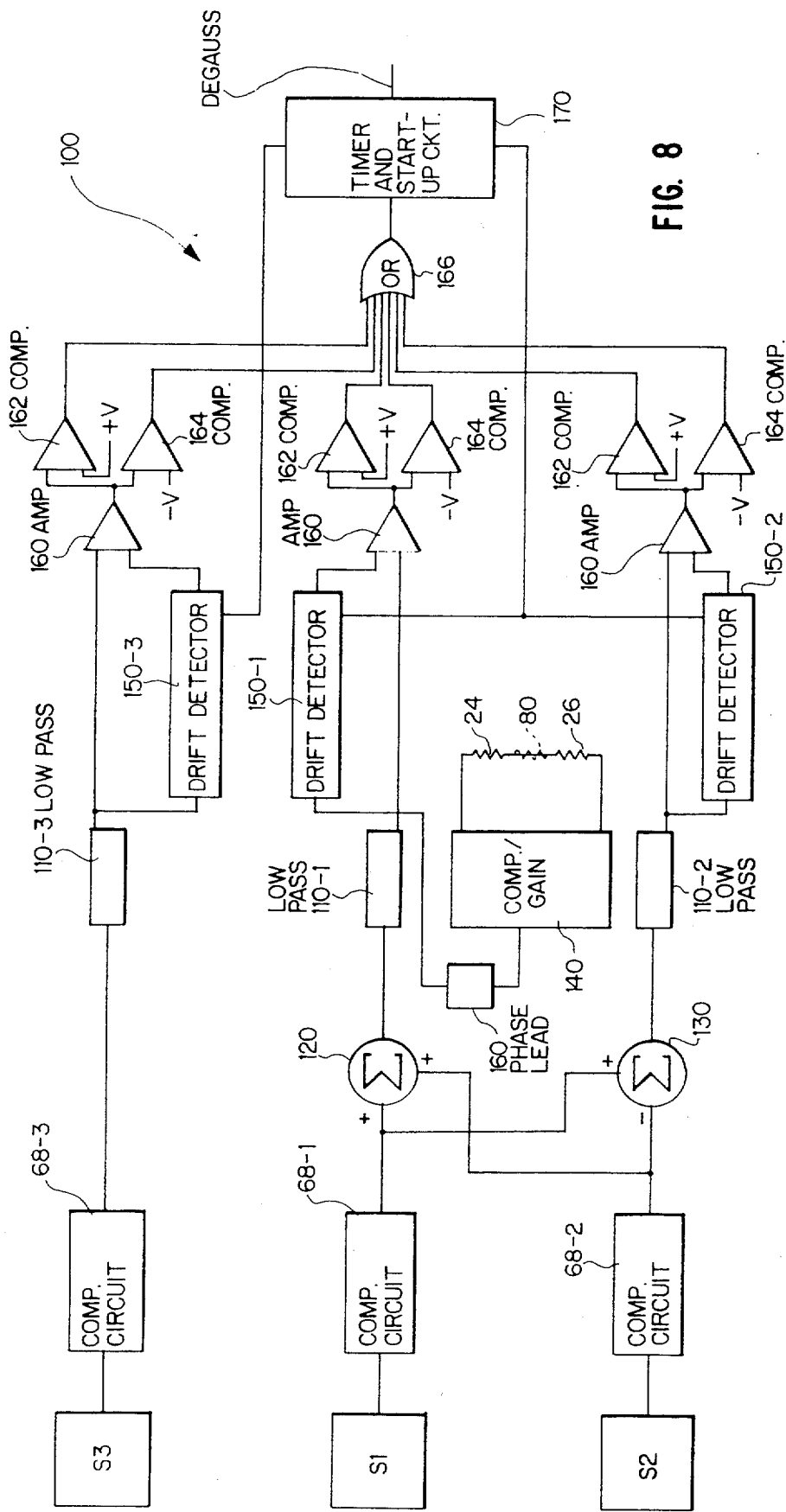
FIG. 8 is a partial block diagram of a preferred circuit in accordance with the present invention for implementing automatic axial compensation and providing degauss control.

FIG. 8 shows a partial block diagram of a circuit for implementing the automatic compensation system 100 and for providing degauss control. In FIG. 8, the convergence correction coil 24 and the purity correction coil 26 are schematically shown. In the preferred embodiments, these coils 24 and 26 are connected in series. Compensation and degauss control circuit 100 applies current to those coils to effect disturbing field compensation. It also provides a degauss control pulse to a degaussing circuit 200 which powers the degaussing coils 28 and 30, which degaussing circuit 200 is shown in block diagram form in FIG. 11, and in schematic form in FIGS. 12a and 12b.

Output from sensor S3 is directly applied to a low pass filter 110-3 by compensation circuit element 68-3. On the other hand, sensors S1 and S2 which measure the axial field and lateral field components $\overline{B}_{ax}$ and $\overline{B}_{lat}$ have their compensation coil circuit elements 68-1, 68-2 connected to provide outputs directly to a summation circuit 120 and a subtraction circuit 130. Output from the sensor S1 and S2 compensation elements 68-1, 68-2 also is applied to the sensor compensation coils 70 as described hereinbefore. Summation or addition circuit 120 sums the value indicated by the sensing signal from the compensation coil conditioning circuit element 68-1 with that of the sensing signal from circuit 68-2 associated with sensor S2 to provide the summation signal which represents the axial magnetic field $\overline{B}_{ax}$ component.

In the preferred embodiments, the summation circuit 120 includes a balance potentiometer which provides for extraction of only the axial signal components by eliminating portions of the signal which indicate the lateral component. Mathematically, this is seen from equations (5) and (8) wherein it is seen that $R_{11at}$ and $R_{21at}$ cancel out. A summation output signal from summation circuit 120 is applied to a phase lead circuit 160 which compensates for a phase lag which is introduced by vortex currents in the magnetic shield 14. These vortex currents, which occur in the shield 14 when it is subjected to low frequency magnetic fields, likewise must be compensated by the system in accordance with the present invention. Shield 14 introduces phase variations (i.e. phase lag) and attenuations in the magnetic fields. Thus, the sensors S1, S2, S3, located in proximity to the screen, sense a delayed and attenuated magnetic field. The phase lead circuit 160 compensates for measurement errors by providing a phase lead function. Output from the phase lead circuit 160 is applied to an actual compensation and gain adjustment circuit element 140 which responds to the summation signal by generating a current for energization of the convergence correction coil 24 and the purity correction coil 26 in order to neutralize the measured axial field component. As will be appreciated by those of ordinary skill in the art, the gain of the compensation and gain adjustment circuit 140 should be adjustable for 100% axial field compensation. Particulars of coils 24 and 26 such as the number of windings in each coil are well known and readily can be selected by those of ordinary skill.

FIGS. 1 and 8 also show monitor 10 and compensation and degaussing circuit 100 as including an optional third deflection yoke correction coil 80 located in proximity to the monitor's deflection yoke 22. It is contemplated that the deflection yoke correction coil 80 could be included to compensate for scan rotation. If included, the third correction coil 80 likewise preferably is physically arranged in parallel with and electrically connected in series with, magnetic field correction coils 24 and 26. Whether coil 80 is omitted or included in the preferred system 100, the correction coils 24, 26, as connected in series, can be connected in any order. Given this disclosure, it now becomes a matter of routine design choice to those of ordinary skill in the art as to how the circuit 140 and coils 24, 26 (and 80) are to be series-connected to provide sufficient axial field compensating current in each coil. Coils 24, 26 (and 80) are seen as driven by one current by their series connection with circuit 140. Also, coils 24, 26 (and 80) do not have a common center.

The remaining elements in circuit 100 are involved with degauss control. The output from addition circuit 120 also is applied to a low pass filter 110-1 which is of the same type as low pass filter 110-3 connected to receive output from vertical component sensor S-3. A third low pass filter 110-2 receives an output from a subtractor 130 which obtains the difference between measured magnetic field values at the regions wherein sensors S1 and S2 are positioned. As shown by equations (9) and (10) this difference value represents the lateral field component strength. The difference value is applied to low pass filter 110-2. According to the preferred embodiments, low pass filters 110-1, 110-2, 110-3 are second order filters. They act to eliminate 50 Hz signals which would induce compensation currents, or possibly inappropriately trigger degaussing action. In the preferred embodiments, the low pass filters obviate compensation for the influence of 50 Hz signals or other low frequency signals which primarily are generated by transformers, and result in a non-homogenous magnetic field, for which compensation is difficult.

With respect to FIG. 9 also, outputs from low pass filters 110-1, 110-2, 110-3 are applied to drift detectors 150-1, 150-2, and 150-3 respectively. In the preferred embodiments, drift detectors 150-1, 150-2, 150-3 have multiple functions. They each include a buffer 151 connected to each respective low pass filter 110-1, 110-2, 110-3. Each drift detector also includes an ADC 155 (analog to digital converter). Before a signal is applied to the ADC, its level is converted so that only a positive voltage remains. This is done by a rescaled voltage +V from the rescale voltage generator 152 and the summator circuit 153. When no conversion is performed, a correction voltage from integrator 154 is applied to the summator 163. During a conversion, the ADC 155 and integrator 154 receive a signal from the timer and start up circuit 170, the correction voltage is held to zero, and the rescale voltage, which is measure of the ambient magnetic field component, is converted to a digital value which is stored in the successive approximation register 156 of the ADC 155. Register 156 acts as a memory. The conversion is done using the well-known successive approximation method. Therefore an 8 bit DAC 157 (digital to analog) and a comparator 159 are provided.

The ADC 155 used in the preferred embodiment is an AD7574 having the special feature that the difference between the incoming analog signal and the DAC 157 signal is always available outside the ADC 155 and comes from summator 158. This difference signal is applied to an integrator 154 which integrates the signal when no conversion is done. Because the output signal of the integrator 154 is fed back to summator 153, the output signal from the summator is held at a constant value and the difference signal coming from summator 158 is held to zero. Because the output of summator 153 remains constant and equals the value at the end of the previous conversion, the output of integrator 154 is the difference between the actual value coming from the low pass filter 110 and the value at the end of the previous conversion. This is an indication of the drift since the previous (last) conversion.

Output from each integrator 154 is provided to a pair of comparator circuits 162, 164. In the preferred arrangement, each drift detector circuit 150-1, 150-2, 150-3 together with dual comparator 162, 164 performs a comparative function wherein the current value of the actual magnetic field component strength is compared with the measured magnetic field component strength value at the end of the last degaussing cycle in order to determine whether a new degaussing cycle should commence. Two such comparators 162 and 164 are provided in order to generate an output signal in the event that the voltage difference is less than −0.7 V or greater than 0.7 V. If so, an output is provided by the respective comparator to the OR gate 166. Of course, OR gate 166 will provide a high signal to the timer and start-up circuit 170 in the event that any of the six comparators provides a high output thereto.

In response to a high output from OR gate 166, timer and start-up circuit 170 provides a degaussing control pulse which is applied to a degaussing circuit 200 such as will be discussed herein in connection with FIGS. 11 and 12a, 12b. After degaussing has been performed, timer and start-up circuit 170 supplies the conversion control signals to the ADC 155 and the integrator 154 of each respective drift detector 150-1, 150-2, 150-3. In response, each successive approximation 156 register stores the new magnetic field component value corresponding to the time at the end of the new degaussing cycle.

In the preferred embodiments, the timer and start-up circuit 170 performs multiple, related functions. For instance, it sets degaussing pulse duration. It is contemplated that the timer and start-up circuit 170 would require a short delay between degauss cycles depending upon whether or not a degaussing circuit, used in connection with the degaussing control circuit of FIGS. 5 and 11, requires a short time, such as a few seconds, in order to efficiently perform degaussing. Also, as explained in connection with the preferred embodiments, the timer and start-up circuit 170 is arranged to provide the conversion control signals.

FIGS. 10a through 10e together make up a circuit diagram showing a preferred implementation of the axial compensation and degauss control circuit 100 in accordance with the present invention. The circuit diagram of these figures also shows preferred implementations of the sensors S1, S2, and S3. They include broken-line blocks to indicate which groups of components correspond to which elements in the block diagram of FIG. 8.

Figure 11:
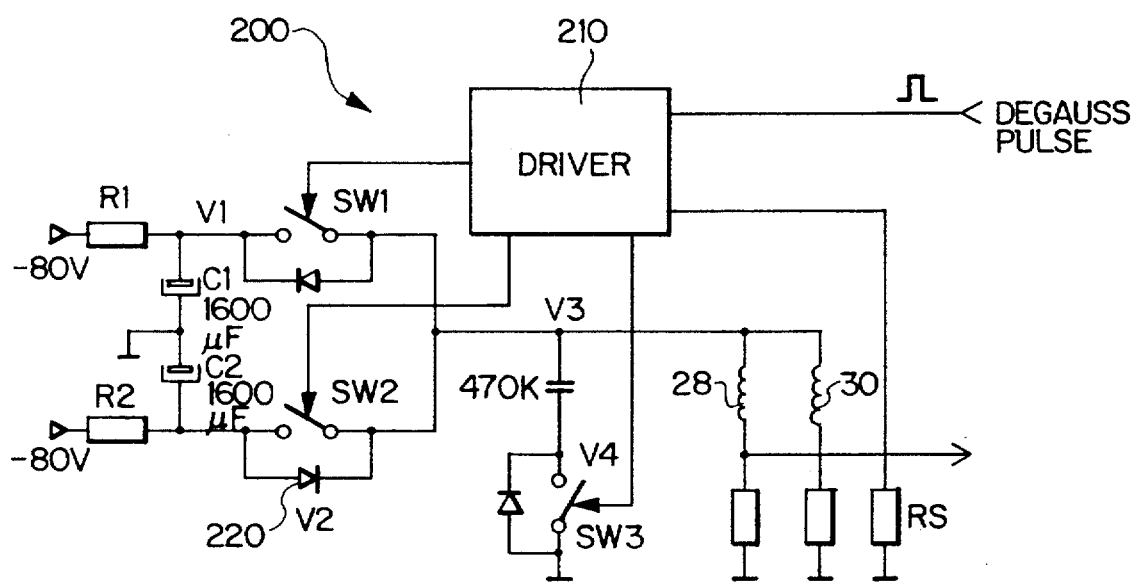
FIG. 11 is partial schematic block diagram of a preferred degaussing circuit suitable for use with the magnetic field compensation and degauss control circuit according to the invention.

FIG. 11 is a partial schematic block diagram of a preferred degaussing circuit 200 suitable for use with the magnetic field compensation system, and monitor system in accordance with the present invention. Circuit 200 effects degaussing for ferro-magnetic elements within CRT 12. Degaussing circuit 200 has a driver element 210 which receives a degauss pulse from the axial component compensation and degauss control circuit 100 shown in FIG. 8. Driver 210 controls the state of two transistor switches Sw1 and Sw2 which are operable to complete circuits for selecting discharging capacitors C1 and C2 through the degauss coils 28, 30. Preferably, capacitors C1 and C2 are large electrolytic capacitors (on the order of 1500 μF) which are charged to opposite polarity. Capacitors C1 and C2 also are connected to voltage sources through resistors R1 and R2 respectively. Another switching circuit branch, including a switch Sw3 and a capacitor C3, also is controlled by driver 210.

Degaussing circuit 200 generates degaussing cycles by switching the voltage over the degaussing coils 28 and 30 between the positive and negative voltages stored in capacitors C1 and C2. Preferably, the cycle has a duration of about 40 ms. Also, in the preferred embodiments, this degaussing circuit provides magnetic compensation for operation in the earth's southern hemisphere, without significant modifications to the circuit.

Figure 12A:
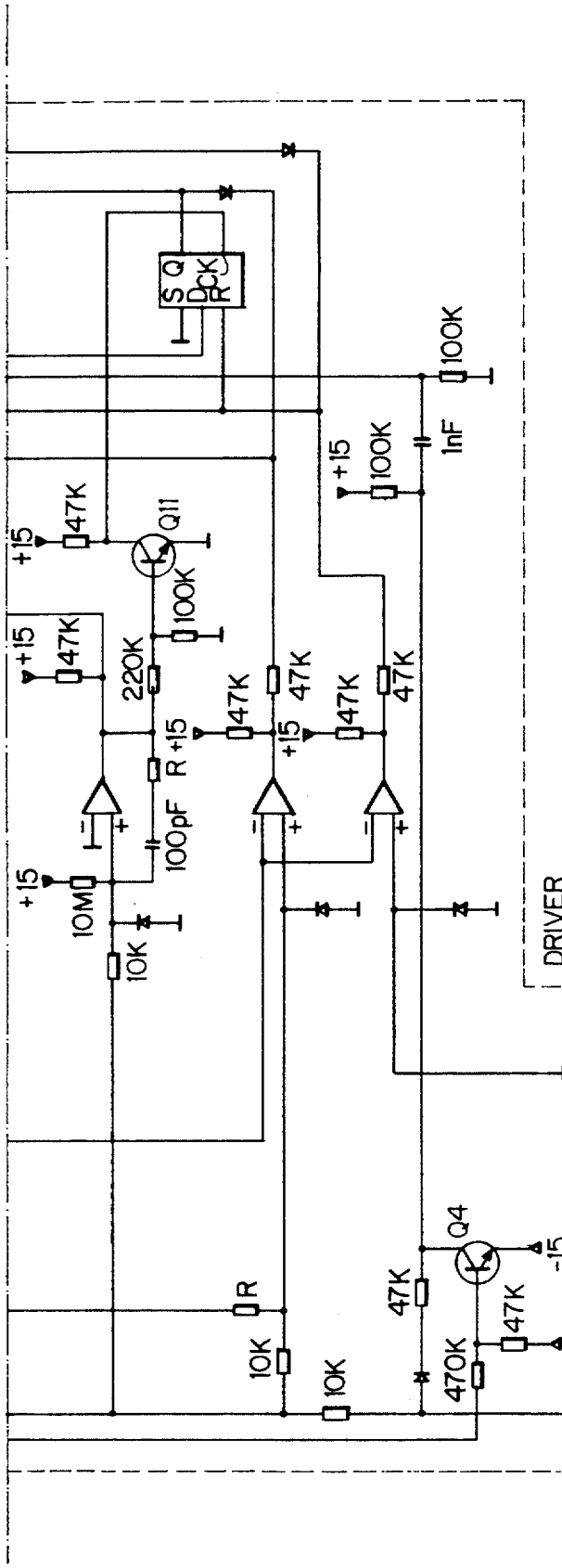
FIGS. 12a and 12b are a circuit diagram showing a preferred implementation of the degaussing circuit of FIG. 10.
Figure 12B:
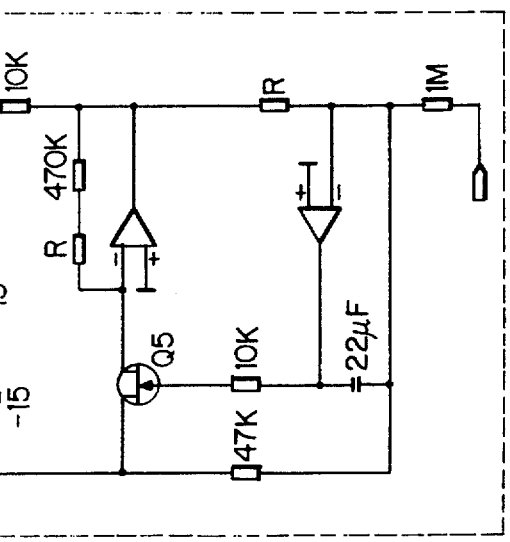

Reference will be made to FIGS. 11, 12a and 12b in describing operation of degaussing circuit 200. At time, $t_0$, capacitors C1 and C2 are charged by their connection with +80V and −80V respectively. When a degaussing control pulse arrives at the input line of driver element 210, the driver circuit responds by closing switch Sw1. When switch Sw1 is closed, points V3 and V4 rise to +80V in 500 ns whereby a linearly rising current begins to flow through the degaussing coils 28, 30. At time $t_1$, switch Sw1 is opened by driver circuit 210, which action tends to stop the degaussing current flow. However, to prevent this condition, the degaussing coils create an EMF which is clamped to −80V by the parasitic diode 220 associated with switch Sw2. This results in a linear decrease in current. Then, at time $t_2$, when the degaussing coil current reaches zero, the driver circuit 210 again is triggered and switch Sw2 closes to cause negative current to flow through the degaussing coils 28, 30. At time $t_3$, Sw2 is opened, and the absolute value of the negative current decreases to zero. At this time, switch Sw1 is closed again.

The on-time of switches Sw1 and Sw2 decreases during the overall degaussing cycle. Consequently, current amplitude also decreases. Between times $t_1$ and $t_2$, switch Sw3 is activated. Due to capacitor C3, current peaks are "smoothed-out" because L-C oscillation occurs at each time during which none of the switches are closed, and the voltage at V3 is not clamped. The resistance of the degaussing coils 28, 30, the internal resistance of the switches Sw1 and Sw2, the internal resistance of the capacitors C1, C2, and the sensing resistors R1, R2 cause a deviation from a piece-wise linear curve. In the preferred embodiments, the function describing the degaussing current approaches a sine wave at the end of a degaussing cycle. This current function is a damped oscillation according to L-C3. Each degaussing cycle has a typical duration of 40 ms. By this time, the absolute value of the voltage over the capacitors C1 and C2 has decreased from 80v to about 65v. This means that only about 30 percent of the energy stored in the capacitors is used.

In accordance with the preferred embodiments, operation during the first period of the degaussing cycle is according to a special preparing function. From $t_0$ to $t_1$, the degaussing circuit draws energy from capacitor C1, which energy is transferred to capacitor C2 during the period from time $t_1$ to time $t_2$, via the parasitic diode 220 associated with switch Sw2. As a result, the point V2 becomes further negative, such that it can supply a higher peak current ($-10A$ at time $t_3$). Preferably, this highest peak current is negative due to implementation of an N-channel FET to provide switch Sw2, wherein such a FET has a lower internal resistance than a p-channel FET which is contemplated as providing switch Sw1.

Next, during the period defined from $t_2$ to $t_3$, the energy stored in capacitor C2 reduces substantially such that the absolute value of the voltages at points V1 and V2 are nearly equal at time $t_3$. The absolute values of the voltages at these points remain nearly equal for the remainder of the cycle; this helps to maintain symmetry in the shape of the function which describes the current. Switch Sw3 is closed after time $t_1$ in order to prevent a current peak from the +80V supply to capacitor C3 during the time that switch Sw1 is closed for the first time. At time $t_1$, the slew rate at point V3 is limited by causing switch Sw1 to change state rather slowly.

Figure 13:
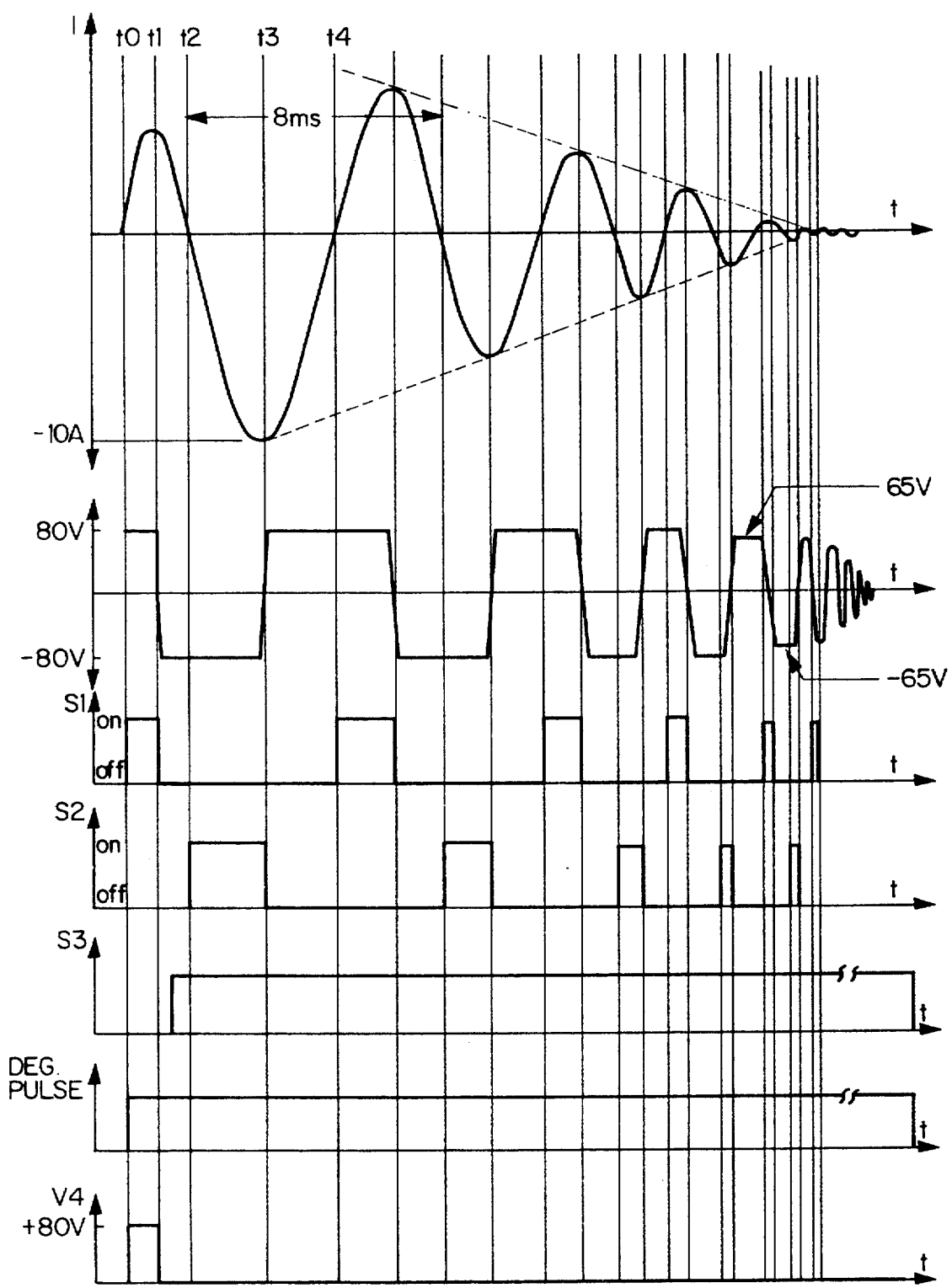
FIG. 13 is a timing diagram useful in understanding operation of the preferred degaussing circuit implementation of FIGS. 12a, 12b.

The following discussion is particular to the circuit diagram of FIGS. 12a and 12b and the timing diagram of FIG. 13 for the degaussing circuit in accordance with the system of the present invention. In FIGS. 12a and 12b, broken line blocks likewise have been provided to denote the elements shown in block-diagrammic form in FIG. 11. During degaussing, capacitors C1 and C2 are partially discharged. They are switched to the degaussing coils by means of two FET switches Q1 and Q2. The states of FETs Q1 and Q2 are switched by drive transistors that are driven by the outputs Q of an SR flip flop U3.

At the time interval, $t_0$ through $t_1$, when a degauss pulse arrives, the output pin 1 of U1 becomes negative for 100 ms. Consequently, transistor Q4 will turn off, such that its collector voltage changes from $-15$ to $+15V$. The slope of the voltage change is differentiated by capacitor C11, a resistor in the array RA4, and resistor R29. This creates a short, 15V pulse at the S input pin 6 of U3. As a result, the degauss cycle begins and pin 1 of U3 goes high, in turn switching on transistor Q1 through drive transistor Q7. The FET gate capacitor of approximately 1 nF makes, together with the 3.3 k$\Omega$ resistor, a time constant of 3 $\mu$s. This period is long enough to switch the FET rather slowly. A 5.1V zener diode D1 prevents switching when the supply voltage is below 6V. In the preferred embodiments, this prevents "false" degaussing actions when the monitor is switched on or off.

When the degaussing circuit is not activated, capacitor C4 is charged by transistor Q6 with approximately 3.5V, and is temperature stabilized by diode D6 and resistor R16. Due to the negative output from U1, capacitor C4 slowly discharges through diode D7 and resistor R18. As long as the voltage over capacitor C4 is higher than 0.1V (which occurs for about 40 ms), pin 2 of U2 remains high and this maintains the inputs D1 and D2 of U3 high. This enables switching of the FETs for a 40 ms period. After this time period, pin 2 of U2 becomes negative so as to disable U3. Accordingly, the circuit performs a damped oscillation in the degauss capacitor C3 to end the degaussing cycle. Moreover, it prevents the switching on of transistors Q1 and Q2 while the voltage over capacitor C3 differs much from the charge voltages of capacitors C1 and C2. This can be expected at the end of a degaussing cycle because the degauss current is then very small. The degaussing current creates a voltage drop over the sensing resistors R12, R13, and R14. This voltage is applied through RA3 to the non-inverting input of U2 (pin 9). Here, the voltage is compared with the voltage over capacitor C4, which is connected to the inverting input. When the voltage over the sense resistors reaches the (slowly decreasing) voltage over capacitor C4, the output (pin 14) of U2 becomes positive. As a result, the reset input (pin 4) of U3 is triggered, whereby pin 1 goes low. Consequently, transistor Q1 turns off, and the current starts to decrease. It is observed that resistor R28 connects the non-inverting input to the voltage at the drain of transistor Q3. As a result, during the period $t_0$ through $t_1$, transistor Q1 is switched off long before the sense voltage matches the voltage over capacitor C4.

From time $t_1$ through $t_2$, when the current reaches zero, pin 1 of U2 switches from positive to negative. This creates a falling edge at the clock input, pin 3 of U3. This clock input is thus reset. At the same time, transistor Q11 will turn off, creating a rising clock edge at pin 11. As a result, output pin 13 will go high; this will turn on transistor Q2 whereby negative current flows through the degaussing coils. Diodes D12 and D13 are provided to prevent transistors Q1 and Q2 from closing at the same time. Transistor Q3 begins to conduct shortly after the voltage of capacitor C3 becomes negative. Then, transistor Q10 begins to conduct through resistor R8 and diode D4. Transistor Q10 will act to turn on transistor Q3. The gate voltage of transistor Q3 is stored by capacitor C5 during the remainder of the cycle so that transistor Q3 remains conducting. When the degaussing control pulse goes low, transistor Q9 is turned on whereby capacitor C5 discharges.

From time $t_2$ through $t_3$, the sense voltage is also fed to the inverting input (pin 6) of U1 through RA3 and FET transistor Q5. Transistor Q5 acts as a variable resistor between 500 $\Omega$ and 2 k$\Omega$. The resistance provided by transistor Q5 is stabilized against temperature variation by integrating regulator U1 (pins 8, 9, 10) and depends on the vertical white uniformity adjustment voltage (VWHUNADJ voltage) and the current through resistor Q4 when degaussing is not active. The VWHUNADJ voltage is a low voltage generated in order to correct the effects of a vertical magnetic field component. During the degaussing cycle, diode 16 is off so that transistor Q4 has no influence on transistor Q5. The output (pin 7) of U1 is proportional to the degaussing current. This pin is connected to the non-inverting input pin 11 of U2 where it also is compared to the voltage over capacitor C4. When both are equal, the output pin 13 of U2 switches from negative to positive to thus create a reset pulse at pin 10 of U3 whereby pin 13 goes low again, and transistor Q2 is opened.

From time $t_3$ through $t_4$, the rising current reaches zero. Then, the output pin 1 of U2 will switch from negative to positive. This switch from negative to positive triggers clock input pin 3 and resets clock input 11 by driving transistor 11 into saturation. Consequently, transistor Q1 will be switched on again.

From time $t_4$ until the end of the cycle, the voltage over capacitor C4 decreases during the degauss cycle. Thus, the on-time of the switching FETs will proportionally decrease. As a result, the amplitude of the degauss current decreases. The end of the cycle is marked when the voltage over capacitor 4 drops below point 0.1V. In this case, U3 becomes disabled by the voltage at pin 2 of U2. The cycle is damped out with a damped oscillation in LC3.

In accordance with the preferred embodiments, the degaussing circuit is also provided with capability for southern hemisphere correction. Accordingly, pins 5, 6, and 7 of U1 are built as an amplifier with a gain of approximately −1. By altering the resistance provided by transistor Q5, the gain can be deviated slightly from a gain of −1. This permits creation of a slight asymmetrical feature in the characteristic current curve of the degaussing current. This asymmetric feature is sufficient to generate a remanent magnetic field to compensate for the earth's magnetic field in the southern hemisphere. This southern hemisphere compensation is controlled by the VWHUNDADJ voltage.

It is to be understood that there can be various changes and modifications to the preferred embodiments of the system of the present invention disclosed herein, which changes and/or modifications may be made by one of ordinary skill in the art, but such would still result in a system well within the scope of the invention as set forth in the claims.

What is claimed is:

1. An apparatus for compensating for a magnetic field which influences a partially magnetic-shielded predetermined volume that is magnetically unshielded at a region in a plane through the volume, said apparatus comprising:

a first magnetic field sensor for providing a first sensing signal which indicates a magnetic field value at a first location with respect to said predetermined volume, said first sensor having a first primary axis of sensitivity which extends from said first location substantially through said region;

a second magnetic field sensor for providing a second sensing signal which indicates a magnetic field value at a second location with respect to said volume, said second sensor having a second primary axis of sensitivity which extends from said second location substantially through said region and which is non-parallel with respect to said first axis of sensitivity, such that a summation of said first value and said second value provides a summation value which substantially indicates an axial component of a magnetic field introduced into said volume through said region in an axial direction which is substantially perpendicular to said plane;

adding means, responsive to a first sensing signal from said first sensor and a second sensing signal from said second sensor, for adding a first value indicative of said first location and a second value indicative of said second location to provide a summation signal which indicates said summation value; and control means, responsive to a summation signal provided by said adding means, for generating an axial magnetic field component compensation signal.

2. An apparatus as claimed in claim 1, further comprising at least one correction coil for generating compensation magnetic fields in response to receipt of an axial field component compensation signal from said control means.

3. An apparatus as claimed in claim 1, wherein
   said control means comprises a phase lead circuit connected to said adding means and a compensation and adjustable gain circuit connected to said phase lead circuit.

4. An apparatus as claimed in claim 3, further comprising at least two correction coils which are connected in series to said compensation and gain circuit.

5. An apparatus as claimed in claim 1, wherein said first location and said second location are external to a shielded portion of said volume and are substantially equidistant in positive and negative x directions about a central point of said volume, whereby said first and second locations define a horizontal axis which is substantially parallel to said plane through said volume and which is substantially perpendicular to said axial direction.

6. An apparatus as claimed in claim 5, further comprising:

a third magnetic field sensor for providing a third sensing signal which indicates a magnetic field value at a third location with respect to said volume, said third sensor having a third primary axis of sensitivity which is substantially perpendicular to said first and second axes of sensitivity, said third sensing signal indicating a magnetic field value of a vertical component of a magnetic field influencing said volume;

subtracting means, responsive to a first sensing signal from said first sensor and a second sensing signal from said second sensor, for obtaining a difference value between a first value indicative of said first location and a second value indicative of said second location and providing a difference value signal indicative of said difference value; and means for providing a degaussing control signal including means for receiving a third sensing signal from said third sensor, a summation signal from said adding means, and a difference value signal from said subtracting means, said means providing a degaussing control signal based upon signals received from said third sensor means, said adding means, and said subtracting means.

7. An apparatus as claimed in 6, wherein said first location and said second location are substantially equidistant in a positive and negative x direction about a central point of said volume, and said third location is displaced from a horizontal axis defined between said first and second locations, in a z direction, said first, second, and third locations being external to a shielded portion of said volume.

8. An apparatus as claimed in claim 7, wherein said means for providing a degaussing control signal comprises;
    register means for storing reference values,
    comparator means which compares magnetic field component values indicated by said first, second and third sensors with reference values stored in said register means, and
    means for selectively changing reference values stored in said memory means.

9. An apparatus as claimed in claim 8, wherein said means for providing a degaussing control signal comprises low pass filter means connected to receive sensing signals from said sensors, first summator means connected to said filter means, said first summator means also receiving a rescale voltage signal and an integrated voltage signal, a second summator means having an input connected to an output of said first summator means, an integrator having an input connected to an output of said second summator means and an output for applying said integrated voltage signal to said first summator means and to said comparator means, a comparator having an input connected to said output of said second summator means, and an output connected to said register means, said register means being connected to apply another input to said second summator means by a digital to analog converter, and logic gate means which receives as inputs, outputs from said comparator means and provides an output for causing degaussing in said volume.

10. A CRT system which compensates for a magnetic field which influences said system through an image surface of a cathode ray tube (CRT) of said system as a result of an ambient magnetic field which surrounds said CRT, said CRT system comprising:
    a magnetic shield which substantially surrounds said CRT, except for said image surface thereof;
    convergence rings;
    a purity correction located near a front portion of said cathode ray tube of said monitor;
    a convergence correction coil positioned about said convergence rings;
    a first magnetic field sensor for providing a first sensing signal which indicates a magnetic field value at a first location with respect to a central point within said CRT, said first sensor having an axis of sensitivity which extends from said first location substantially through a region of said image surface;
    a second magnetic field sensor for providing a second sensing signal which indicates a magnetic field value at a second location with respect to said central point, said second sensor having an axis of sensitivity which extends from said second location substantially through said region;
    said first location and said second location being exterior of said shield and being such that a summation of said first value and said second value provides a summation value representative of an axial component of a magnetic field introduced into said CRT in an axial direction which is substantially perpendicular to said image surface;
    an addition circuit, responsive to a first sensing signal from said first sensor and a second sensing signal from said second sensor, for adding a first value indicative of said first location and a second value indicative of said second location to provide a summation value signal which indicates said summation value; and
    an axial component compensation control circuit, responsive to a summation signal provided by said addition circuit, for generating an axial magnetic field component compensation signal and applying said compensation signal to said purity correction coil and said convergence correction coil.

11. A system as claimed in claim 10, further comprising:
    a third magnetic field sensor for providing a third sensing signal which indicates a magnetic field value at a third location with respect to said central point, said third sensor having a third primary axis of sensitivity which is substantially perpendicular to said first and second axes of sensitivity, said third sensing signal indicating a magnetic field value of a vertical magnetic field component of an ambient magnetic field which surrounds said CRT; and
    a subtraction circuit, responsive to a first sensing signal from said first sensor means and a second sensing signal from said second sensor means, for obtaining a difference value between a first value indicative of said first location and a second value indicative of said second location and providing a difference value signal indicative of said difference value; and
    a degaussing control circuit, responsive to a third sensing signal from said third sensor, a summation value signal from said addition circuit, and a difference value signal from said subtraction circuit, for providing a degaussing control signal.

12. A system as claimed in claim in 11, further comprising a degaussing circuit for degaussing in said CRT in response to a degaussing control signal provided by said degaussing control circuit.

13. A system as claimed in claim 12, wherein said first sensor and said second sensor are substantially equidistant in a positive and negative x direction and said third sensor is removed from a horizontal axis defined between said first and second locations in the y and z directions.

14. A system as claimed in claim 13, wherein said axial component compensation control circuit comprises an axial compensation and gain adjustment circuit which receives a summation signal from said addition circuit and provides an adjusted summation signal which is applied to said purity correction and said convergence correction coil.

15. A system as claimed in claim 14, wherein said purity correction coil and said convergence correction coil are connected in series to said axial compensation and gain adjustment circuit.

16. A system as claimed in claim 15, wherein said degaussing control circuit comprises:
    registers for storing reference values,
    comparator circuits which compare magnetic field component values indicated by said first, second and third sensors with reference values stored in said registers and,
    a timer and start up circuit which selectively changes reference values stored in said registers.

17. A system as claimed in claim 16, wherein said timer and start up circuit further generates said degaussing control signal of said degaussing control circuit.

18. A system as claimed in claim 17, wherein said degaussing control circuit further comprises low pass filters connected to receive sensing signals from said sensors, a first summator connected to said filters, said first summator also receiving a rescale voltage signal and an integrated voltage signal, a second summator having an input connected to an output of said first summator, an integrator having an input connected to an output of said second summator means and an output for applying said integrated voltage signal to said first summator means and to said comparator circuits, a comparator having an input connected to said output of said second summator, and an output connected to said registers, said registers means being connected to apply another input to said second summator by a digital to analog converter, and a logic gate which receives outputs from said comparator circuits, and provides an output to said timer and start up circuit whereby said timer and start up circuit applies a degaussing control signal to said degaussing circuit.

19. A system as claimed in claim 18, wherein said degaussing circuit comprises: a driver circuit connected to receive a degaussing control signal from said degaussing control circuit, capacitive means, a degaussing coil, and switch means responsive to said driver circuit, for selectively connecting said capacitive means to said degaussing coil.

20. A system as claimed in claim 16, wherein said degaussing circuit comprises:
   a degaussing coil;
   capacitive means for storing a positive voltage and a negative voltage and selectively applying one of said voltages to an end of said degaussing coil;
   means for switching said capacitive means between a first condition in which it provides said positive voltage as an output and a second condition in which it provides said negative voltage as an output so as to provide an AC current which has an amplitude which gradually decreases in time,
   current sensing means adapted to be connected to another end of said degaussing coil to which said capacitive means is connected for providing a current signal proportional to current flow in said degaussing coil; and
   control means for controlling said switching means in response to receipt of a current signal from said current sensing means to control current flow in said degaussing coil such that the current flow is an AC current with a gradually decreasing amplitude, said control means ending a degaussing cycle by preventing said switching means and said capacitive means from applying voltage to said a degaussing coil, whereby current flow in said degaussing coil exhibits damped oscillation as a degaussing cycle terminates.

21. An automatic magnetic immunity system adapted for use in compensating for a magnetic field which influences a cathode ray tube (CRT) type monitor equipped with a magnetic shield which substantially shields the CRT except at an image face thereof, said system comprising:
   a first magnetic field sensor for providing a first sensing signal which indicates a magnetic field value at a first location external of a shielded portion of said CRT, said first sensor having a first primary axis of sensitivity which extends from said first location substantially through said image face;
   a second magnetic field sensor for providing a second sensing signal which indicates a magnetic field value at a second location external of a shielded portion of said CRT, said second sensor having a second primary axis of sensitivity which extends from said second location substantially through said image face and which is non-parallel with respect to said first axis of sensitivity, such that a summation of said first value and said second value provides a summation value which substantially indicates an axial component of a magnetic field introduced into said CRT through said image face in an axial direction which is substantially perpendicular to said image face;
   a third magnetic field sensor for providing a third sensing signal which indicates a magnetic field value at a third location external of a shielded portion of said CRT, said third sensor having a third primary axis of sensitivity which is substantially perpendicular to said first and second axes of sensitivity, said third sensing signal indicating a magnetic field value of a vertical component of a surrounding magnetic field;
   adding means, responsive to a first sensing signal from said first sensor and a second sensing signal from said second sensor, for adding a first value indicative of said first location and a second value indicative of said second location to provide a summation signal which indicates said summation value;
   subtracting means, responsive to a first sensing signal from said first sensor and a second sensing signal from said second sensor, for obtaining a difference value between a first value indicative of said first location and a second value indicative of said second location and providing a difference value signal indicative of said difference value;
   control means, responsive to a summation signal provided by said adding means, for generating an axial magnetic field component compensation signal;
   means for providing a degaussing control signal based upon a summation signals provided by said adding means, difference value signals provided by said subtracting means, and third sensing signals provided by said third sensor; and
   a degaussing circuit means for degaussing a CRT in response to a degaussing control signal provided by said means for providing a degaussing control signal.

22. A system as claimed in 21, wherein said first location and said second location are substantially equidistant in a positive and negative x direction about a central point in said CRT, and said third location is displaced from a horizontal axis defined between said first and second locations, in a z direction.

23. A system as claimed in claim 22, wherein said means for providing a degaussing control signal comprises;
   register means for storing reference values,
   comparator means which compares magnetic field component values indicated by said first, second and third sensors with reference values stored in said register means, and provides comparative results indicative thereof, and
   timing and start up circuit means for generating said degaussing signal of said degaussing control circuit and for selectively changing reference values stored in said memory means based upon comparative results from said comparator means.

24. A system as claimed in claim 23, wherein said degaussing circuit means comprises a driver circuit connected to receive a degaussing control signal from said means for providing a degaussing control signal, capacitive means and switch means responsive to said driver circuit, for selectively connecting said capacitive means to a degaussing coil, said capacitive means comprising a first capacitor adapted to be charged to a positive voltage and a second capacitor adapted to be charged to a negative voltage, and said switch means comprises switches for selectively connecting a terminal of each of said capacitors to a degaussing coil.

25. A system as claimed in claim 21, wherein said degaussing circuit comprises:
capacitive means for storing a positive voltage and a negative voltage and selectively applying one of said voltages to an end of a degaussing coil;
means for switching said capacitive means between a first condition in which it provides said positive voltage as an output and a second condition in which it provides said negative voltage as an output so as to provide an AC current which has an amplitude which gradually decreases in time;
current sensing means adapted to be connected to another end of a degaussing coil to which said capacitive means is connected for providing a current signal proportional to current flow in such a degaussing coil; and
control means for controlling said switching means in response to receipt of a current signal from said current sensing means to control current flow in such degaussing coil such that the current flow is an AC current with a gradually decreasing amplitude, said control means ending a degaussing cycle by preventing said switching means and said capacitive means from applying voltage to such a degaussing coil, whereby current flow in such degaussing coil exhibit damped oscillation as a degaussing cycle terminates.

26. A method of compensating for a magnetic field which influences a cathode ray tube type monitor equipped with a magnetic shield which substantially surrounds the monitor cathode ray tube except at the image face thereof, said method comprising the steps of:
providing a first sensing signal which indicates a magnetic field value at a first location external to the shield by use of a first magnetic field sensor which has a first primary axis of sensitivity which extends from said first location substantially through a region of said image surface;
providing a second sensing signal which indicates a magnetic field value at a second location external to the shield by use of a second magnetic field sensor which has a second primary axis of sensitivity which extends from said second location substantially through said region and which is nonparallel with respect to said first axis of sensitivity, such that a summation of said first value and said second value provides a summation value which substantially indicates an axial component of a magnetic field introduced into said volume through said region in an axial direction which is substantially perpendicular to said image face;
adding a first value indicative of said first location and a second value indicative of said second location to provide a summation value; and
generating an axial magnetic field component signal based upon said summation value.

27. A method as claimed in claim 26, further comprising the steps of:

providing a third sensing signal which indicates a magnetic field value at a third location external to the shield by a third magnetic field sensor which has a third primary axis of sensitivity which is substantially perpendicular to said first and second axes of sensitivity, said third sensing signal indicating a magnetic field value of a vertical magnetic field component of an ambient magnetic which surrounds said monitor;
obtaining a difference value between a first value indicative of said first location and a second value indicative of said second location to provide a difference value;
generating a degaussing control signal based upon said summation value, said difference value and said magnetic field value at said third location.

28. A method as claimed in claim 27, wherein said step of providing a degaussing control signal comprises the steps of;
storing reference values,
comparing magnetic field component values at said first, second and third locations with said stored reference values,
changing said references value after said degaussing control signal has been generated.

29. A method system as claimed in claim 27, further comprising the steps of upon generation of a degaussing control signal, using a degaussing circuit which comprises capacitive means for storing a positive voltage and a negative voltage and selectively applying one of said voltages to an end of a degaussing coil, means for switching said capacitive means between a first condition in which it provides said positive voltage as an output and a second condition in which it provides said negative voltage as an output so as to provide an AC current which has an amplitude which gradually decreases in time, current sensing means adapted to be connected to another end of said degaussing coil to which said capacitive means is connected for providing a current signal proportional to current flow in said degaussing coil, and control means for controlling said switching means in response to receipt of a current signal from said current sensing means to control current flow in said degaussing coil such that the current flow is an AC current with a gradually decreasing amplitude, said control means ending a degaussing cycle by preventing said switching means and said capacitive means from applying voltage to said degaussing coil, whereby current in said degaussing coil exhibits damped oscillation at a termination of a degaussing cycle.

30. A degaussing system for degaussing ferromagnetic elements within a predetermined volume by applying a voltage to a degaussing coil provided in the volume, said system comprising:
capacitive means for storing a positive voltage and a negative voltage and selectively applying one of said voltages to an end of a degaussing coil;
means for switching said capacitive means between a first condition in which it provides said positive voltage as an output and a second condition in which it provides said negative voltage as an output so as to provide an AC current which has an amplitude which gradually decreases in time,
current sensing means adapted to be connected to another end of a degaussing coil to which said capacitive means is connected for providing a current signal proportional to current flow in such a degaussing coil; and control means for controlling said switching means in response to receipt of a current signal from said current sensing means to control current flow in such degaussing coil such that the current flow is an AC current with a gradually decreasing amplitude, said control means ending a degaussing cycle by preventing said switching means and said capacitive means from applying voltage to such a degaussing coil, whereby current in said degaussing coil exhibits damped oscillation at a termination of a degaussing cycle.

31. A CRT system comprising:

a cathode ray tube (CRT);

a degaussing coil in proximity to said CRT; and a degaussing system for applying a voltage to said degaussing coil to provide degaussing for ferromagnetic elements in said CRT, said degaussing system including:

capacitive means for storing a positive voltage and a negative voltage and selectively applying one of said voltages to an end of a degaussing coil;

means for switching said capacitive means between a first condition in which it provides said positive voltage as an output and a second condition in which it provides said negative voltage as an output so as to provide an AC current which has an amplitude which gradually decreases in time, current sensing means adapted to be connected to another end of a degaussing coil to which said capacitive means is connected for providing a current signal proportional to current flow in such a degaussing coil; and control means for controlling said switching means in response to receipt of a current signal from said current sensing means to control current flow in such degaussing coil such that the current flow is an AC current with a gradually decreasing amplitude, said control means ending a degaussing cycle by preventing said switching means and said capacitive means from applying voltage to such a degaussing coil, whereby current in said degaussing coil exhibits damped oscillation at a termination of a degaussing cycle.

* * * * *